United States Patent [19]

Hart

[11] 4,405,182

[45] Sep. 20, 1983

[54] CONTROL VALVE ARRANGEMENT FOR COMBINED BRAKE CYLINDER AND AIR RESERVOIR DEVICE

[75] Inventor: James E. Hart, Trafford, Pa.

[73] Assignee: American Standard Inc., Wilmerding, Pa.

[21] Appl. No.: 300,705

[22] Filed: Sep. 8, 1981

[51] Int. Cl.³ .......................... B60T 8/18; B60T 15/42
[52] U.S. Cl. .................................. 303/23 R; 303/33; 303/36; 303/38
[58] Field of Search ........................ 303/23, 33, 35, 36, 303/37, 38, 39, 57–67, 68, 69, 81, 86, 70, 71, 72–74, 76, 79, 85; 188/195; 92/212, 49, 64

[56] References Cited

U.S. PATENT DOCUMENTS

| Re. 30,408 | 9/1980 | Hart | 303/35 |
| 4,106,819 | 8/1978 | Hart | 303/38 |
| 4,225,193 | 9/1980 | Hart | 303/35 |
| 4,339,155 | 7/1982 | Hart | 303/38 |
| 4,378,950 | 4/1983 | Hart | 303/36 |

*Primary Examiner*—Douglas C. Butler
*Attorney, Agent, or Firm*—G. J. Falce

[57] ABSTRACT

Brake apparatus for a railway vehicle including a brake cylinder device of the type having a pair of interconnected pistons of unequal size to which the vehicle brake rigging is connected. The larger power piston forms an application chamber and a release chamber on its opposite sides in which air is stored for use in controlling the vehicle brakes. The brake apparatus further includes a control valve device that is operative responsive to a reduction of brake pipe pressure to conduct flow of air from the release chamber to a positioning chamber formed on the side of the smaller positioning piston corresponding to the side of the power piston having the application chamber, to effect movement of the interconnected pistons to a brake application position. A transfer valve is actuated to connect this flow of air from the release chamber to atmosphere when the positioning chamber pressure exceeds, by a certain amount, a predetermined pressure at which the positioning piston is designed to move the power piston to application position. This certain amount by which the positioning chamber pressure is required to exceed the predetermined pressure, in order to actuate the transfer valve varies with the release chamber pressure effective at the time of a brake application.

78 Claims, 6 Drawing Figures

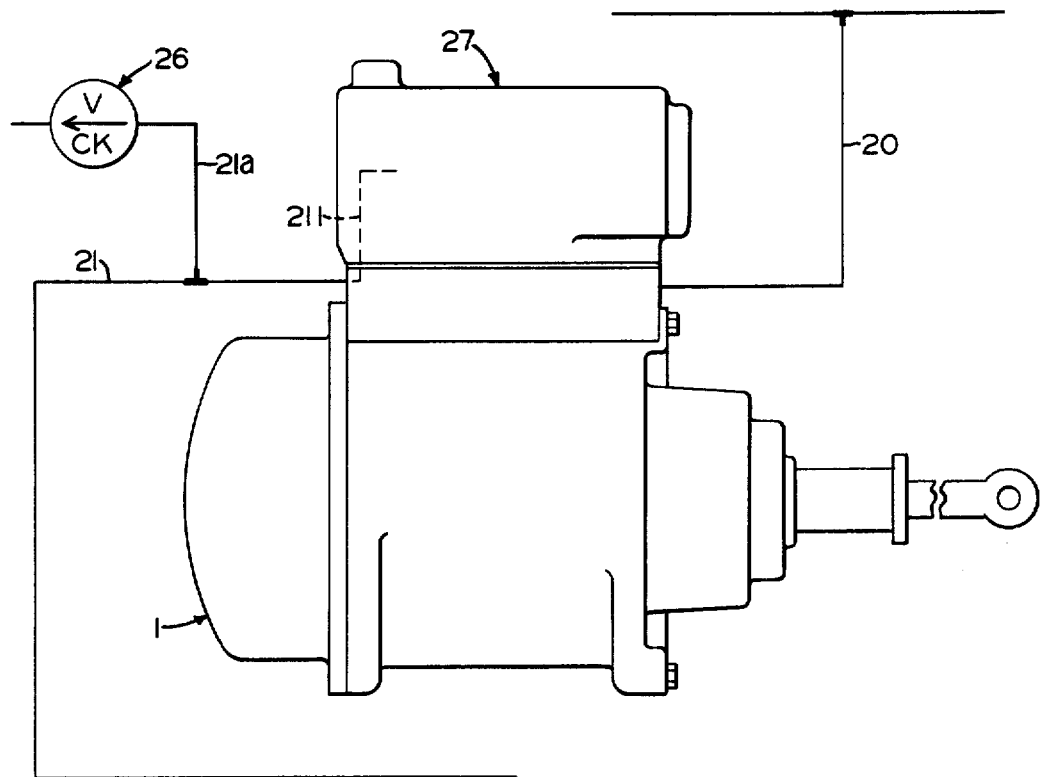
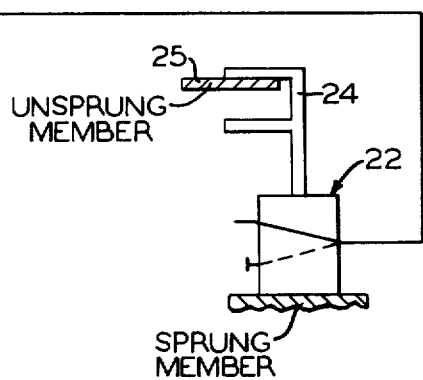
Fig. 6

CONTROL VALVE ARRANGEMENT FOR COMBINED BRAKE CYLINDER AND AIR RESERVOIR DEVICE

BACKGROUND OF THE INVENTION

The present invention is concerned with brake apparatus for railway vehicles and particularly to such brake apparatus as disclosed in U.S. patent application, Ser. No. 195,149 filed Oct. 8, 1980, now U.S. Pat. No. 4,339,155 assigned to the assignee of the present invention.

In the above-mentioned patent application, there is shown a dual-piston brake cylinder device that is arranged to provide for storage of sufficient air as necessary to develop the desired brake forces, without the need for separate, conventional storage reservoirs. The dual pistons are tandem-connected, one being larger than the other and cooperating with the brake cylinder body to form air storage chambers on its opposite sides.

During brake release, air is supplied to these storage chambers by a control valve device that is operative in response to variations in the train brake pipe pressure. When a brake application is initiated, the control valve device connects air from one side of the larger power piston to the opposite side of the smaller positioning piston. A one-way check valve device is provided to effect pressure equalization between the opposite sides of the larger piston to permit movement of the dual pistons in a brake application direction under the influence of the pressure acting on the smaller piston. Once the tandem-connected pistons are in application position, the control valve releases pressure from the one side of the power piston to establish a pressure differential thereacross and accordingly produce braking force.

In order to conserve pressurized air, it is of primary importance to assure complete movement of the dual piston assembly to brake application position before allowing the air to exhaust from the one side of the larger piston, since in application position, the volume of air in the chamber formed at the one side of the larger piston is minimized. In the aforementioned patent, complete movement of the dual piston assembly to brake application position is determined by sensing the pressure effective at the positioning piston by means of a transfer valve, which in turn pilots a valve to cause the air in the chamber at the one side of the larger piston to be exhausted, while concurrently terminating further pressurization of the positioning piston. The point at which the transfer valve thus operates to cut-off further pressurization of the positioning piston and to exhaust the chamber on the one side of the power piston is hereinafter referred to as the "transfer point".

It will be appreciated that in the foregoing Patent, the positioning piston pressure at which this "transfer point" occurs is predetermined regardless of the pressure existing in the air storage chambers at the time of a brake application. Since in actual practice, brake rigging friction varies, as do other factors which influence actual movement of the brake rigging, the pressure required to establish complete movement of the dual piston assembly to brake application position also varies. When the preset "transfer point" occurs before complete movement of the piston assembly is realized, pressure is exhausted from the one side of the power piston before the volume of air thereat is reduced to its minimum. Consequently, an excess amount of air is used to effect application of the brakes. This problem could be overcome by designing the transfer valve to actuate at a relatively high positioning piston pressure to assure complete movement of the dual piston assembly to brake application position under the worst contemplated conditions of brake rigging friction etc., before effecting release of pressure from the one side of the power piston.

It will be appreciated, however, that such a high pressure setting of the "transfer point" precludes obtaining a fully effective brake application under conditions of low train pressure, since the equalization of pressures from the one side of the power piston to the opposite side of the positioning piston could fail to establish sufficient pressure to actuate the transfer valve, and therefore the "transfer point" could not be reached. Without actuation of the transfer valve, of course, the pressure differential capable of being developed across the power piston is reduced, thus degrading the brake force development.

It is therefore an object of the present invention to provide a transfer valve having a variable "transfer point" predicated on the level of pressure to which the brake equipment is charged at the time of a brake application.

By providing a high "transfer point" in order to assure completion of the piston stroke before venting the release chamber pressure, however, a situation arises in which a nonlinear brake force is produced, i.e., a force which is not continuously proportional to the amount of brake pipe pressure reduction. During the interim period after the piston movement toward brake application position has stopped and prior to subsequent actuation of the transfer valve device, a brake force is developed in accordance with the degree of pressurization of the positioning chamber, as well as the pressure differential developing across the power piston. Following actuation of the transfer valve device, however, the effective positioning chamber pressure remains fixed and only the developing pressure differential across the power piston changes. Consequently, the resultant brake force follows a different "curve" and is therefore not linear.

It is another object of the present invention, therefore, to provide a brake force buildup curve that is substantially linear, irrespective of the "transfer point" at which the transfer valve device is actuated, thereby assuring compatibility with conventional brake equipments in the brake force realized in response to a given brake pipe reduction.

It is yet another object of the invention to provide an empty/load brake control arrangement for modifying the brake force realized in accordance with the vehicle load condition during both service and emergency brake applications.

SUMMARY OF THE INVENTION

The foregoing objects are achieved in the present invention by providing brake apparatus for a railway vehicle including a brake cylinder device of the type having a pair of interconnected pistons to which the vehicle brake rigging is connected, a larger one of the pistons having formed on opposite sides thereof first and second chambers in which compressed air is stored for use in controlling the vehicle brakes, and a control valve device having a service valve assembly that is operative in response to a reduction of brake pipe pressure during an initial stage of brake operation to effect a quick service reduction of brake pipe pressure by connection of the brake pipe pressure to a third chamber formed on the one side of the smaller piston concurrent with connection thereto of the pressure in the first chamber formed on the side of the larger piston opposite the one side of the smaller piston. Until sufficient force is developed at the smaller piston to move the dual pistons and brake rigging to brake application position, the air stored in the second chamber is equalized with the air in the first chamber to prevent a pressure differential from developing across the larger piston during this initial stage of operation.

A transfer valve device is subsequently operative to connect the air in the first chamber to atmosphere, thereby establishing a pressure differential between the first and second chambers on opposite sides of the power piston to obtain the braking force desired. The transfer valve device is effective to vary the "transfer point", that is, the point at which the first chamber air is exhausted. The higher the pressure that exists in the first chamber, the later in time the "transfer point" occurs. This provides additional time to pressurize the third chamber and thereby attain full movement of the dual piston assembly to brake application position before the air in the first pressure chamber is exhausted. On the other hand, if the first chamber pressure is so low as to not establish sufficient pressure at the positioning piston to effect movement of the dual piston assembly to brake application position, the "transfer point" will occur earlier in time in order to still connect air in the first chamber to atmosphere and thereby obtain whatever braking force is capable of being developed from the low pressure available.

Since the transfer valve according to the present invention provides for a variable "transfer point", the control valve service valve assembly is arranged with a compensating piston subject to the pressure in the third chamber to provide for a linear buildup of braking pressure, so as to match the buildup curve of conventional brake equipments for applications exceeding a minimum service brake application.

In addition, an empty/load brake control arrangement is provided, which controls the degree of reduction of pressure in the first chamber following operation of the transfer valve to adjust the level of brake force realized in accordance with the vehicle load condition.

BRIEF DESCRIPTION OF THE DRAWINGS

These objectives and other advantages of the present invention will become apparent from the following detailed description, when taken with the accompanying drawings in which:

FIG. 5 is a partial diagrammatic view of an alternate arrangement of the transfer valve device employed in the control valve; and FIG. 6 is a diagrammatic view of the combined brake cylinder and air reservoir device showing an alternate empty/load valve arrangement.

DESCRIPTION AND OPERATION

Figure 1:
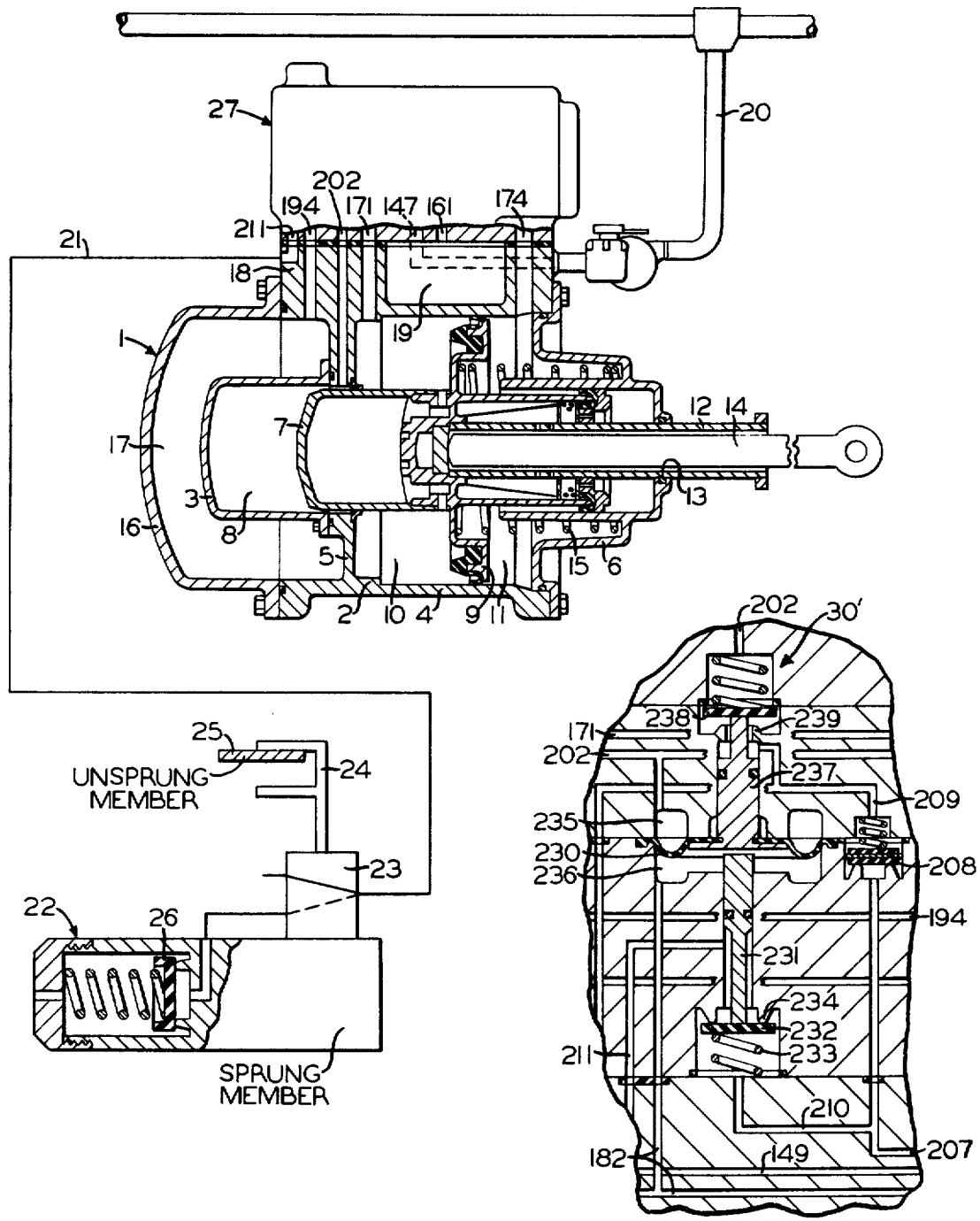
FIG. 1 is a partial sectional assembly and partial outline view showing the combined brake cylinder and air reservoir device and control valve device of the present invention having an empty/load valve arrangement associated therewith.

As shown in FIG. 1 of the drawings, the brake apparatus of the present invention includes a combined brake cylinder and air reservoir device 1 including a main body 2 having different sized cylindrical portions 3 and 4. The smaller cylindrical portion 3 is bolted to a central wall 5 of body 2, while the larger cylindrical portion 4 is integral with the main body and is closed by a separate closure member 6.

Cylindrical portion 3 contains a positioning piston 7 that cooperates with the end wall of cylindrical portion 3 to form a positioning chamber 8 at one end. Cylindrical portion 4 contains a power piston 9 that cooperates with central member 5 to form a brake application chamber 10 at one end and with closure member 6 to form a brake release chamber 11 at its opposite end. Positioning piston 7 and power piston 9 are connected together as an integral dual piston assembly having two separate piston areas.

Power piston 9 is in turn connected to a hollow piston rod 12 that sealingly extends through an opening 13 in closure member 6. Standard type brake rigging (not shown) may be actuated by a push rod 14 carried within and extending from hollow piston rod 12 in a conventional manner to transmit brake forces generated at pistons 7 and 9. A return spring 15 is disposed in chamber 11 and acts on piston 9 to urge piston 9 from a brake application position, as shown, to a brake release position, in which a cushion stop carried by the piston engages central wall 5.

An enclosure member 16 is suitably mounted at a flange thereof to main body 2, so as to form an emergency pressure chamber 17 between the enclosure member 16 and the smaller cylindrical portion 3 of main body 2. A mounting boss 18 of brake cylinder device 1 is integral with main body 2 and includes a quick action chamber 19 and a plurality of ports connected to the various chambers of the brake cylinder device. Also connected to mounting boss 18 is a branch pipe 20 of the train brake pipe, and an exhaust line 21 in which an empty/load changeover valve device 22 is disposed.

Changeover valve device 22 comprises a two-position, three-connection valve having an actuator 24 that is adapted to engage a sensing arm 25 formed on the unsprung member of the vehicle. The changeover valve device 22 is mounted on a sprung portion of the vehicle so that relative movement therebetween under different load conditions of the vehicle is effective to set the valve in one or the other of its two positions. In one position corresponding to deflection of the sprung portion of the vehicle under increased loading of the vehicle, fluid pressure in exhaust line 21 is vented directly to atmosphere, while in the other position corresponding to an empty condition of car loading, the pressure in exhaust line 21 is vented to atmosphere via a spring loaded check valve device 26.

In the alternate arrangement of the invention, shown in FIG. 6, exhaust line 21 is blanked in the other position of the changeover valve device 22 and the spring loaded check valve device 26 is disposed in exhaust line 21, as shown, or in passage 211 within the control valve device 27.

Attached to the face of mounting boss 18 is a brake control valve device 27, which comprises a service valve device 28, an application and release valve assembly 29, a transfer valve device 30, a manual release valve device 31, a combined quick service and emergency valve device 32, an inshot valve device 33, and a vent valve device 34.

Figure 2:
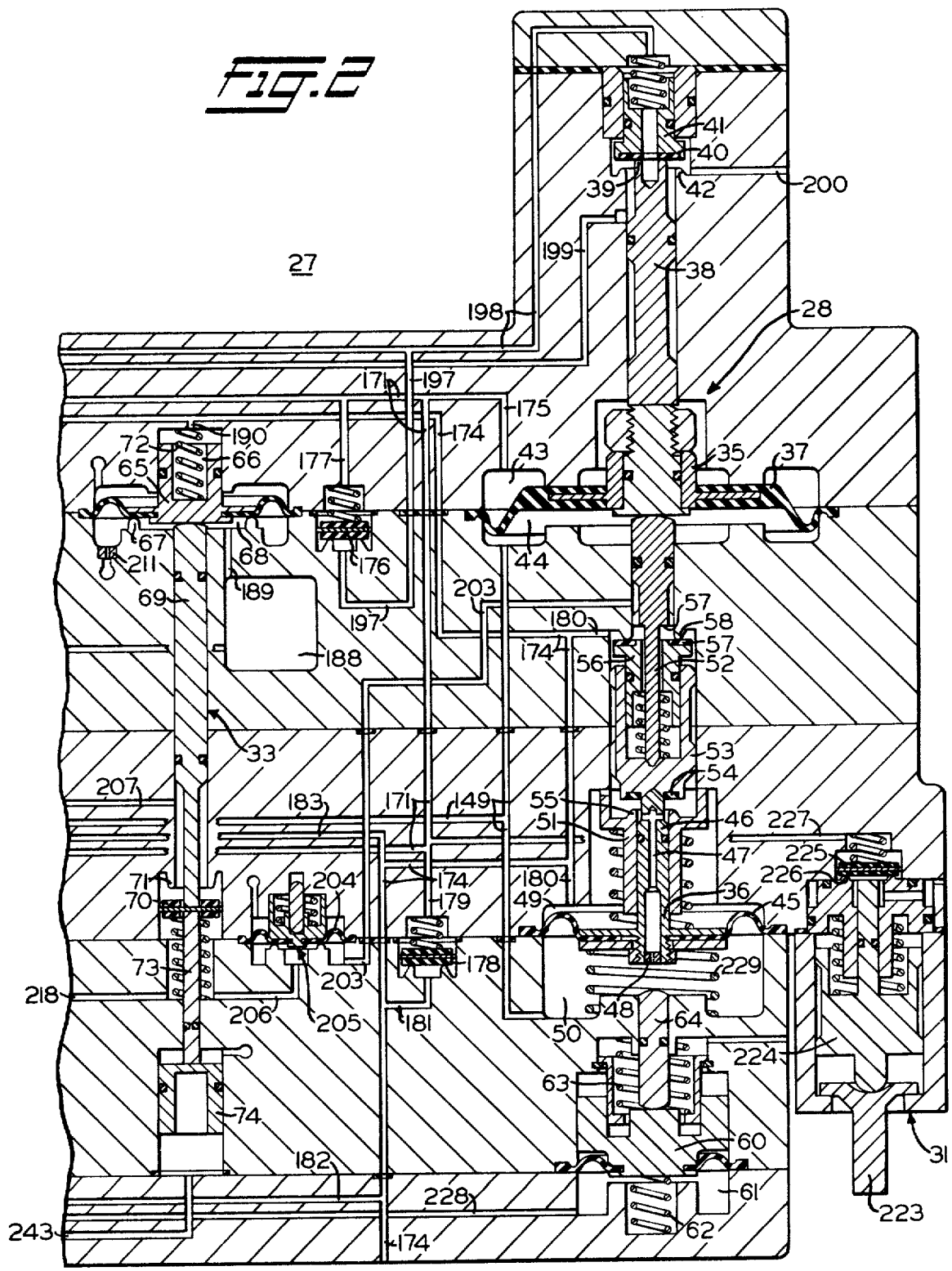
FIGS. 2, 3 and 4 are diagrammatic views, which when aligned side-by-side show the control valve portion of the brake apparatus of FIG. 1.

Referring to FIG. 2, service valve device 28 (sometimes referred to as the service piston stack) comprises a pair of different sized piston abutments 35 and 36. One of these piston abutments 35 includes a diaphragm piston 37, to which is connected a piston stem 38 having an annular valve seat 39 formed on its end. An annular seal ring 40 carried on an application/release pilot valve member 41 is arranged to cooperate with valve seat 39, and with an annular valve seat member 42 carried on the main body in surrounding relation with seat 39. A chamber 43 is formed on one side of diaphragm piston 37 and a chamber 44 is formed on the opposite side.

The other piston abutment 36 includes a diaphragm piston 45 having a stem 46 projecting in the direction of piston abutment 35. Stem 46 is provided with a central passage 47 having a stability choke 48 therein, via which fluid pressure in chambers 49 and 50 on opposite sides of diaphragm piston 45 are communicated. An annular valve seat member 51 is slidably carried about stem 46, which stem is connected to another stem 52 through a release stability valve member 53 having an annular seal ring 54 spaced adjacent an annular seat 55 of valve seat member 51. A bore in release stability valve member 53 slidably carries a graduated application valve member 56 having an annular seal ring 57 adjacent an annular valve seat 58 formed on the main body. A shoulder 59 is formed on stem 52 in spaced-apart relation to graduated application valve member 56 a distance greater than the spaced distance between seal ring 54 of release stability valve member 53 and valve seat 55, which latter distance is, in turn, greater than the distance between seal ring 40 and valve seat 42 of pilot valve member 41 in release position of service valve 28, as shown, to obtain sequential operation of the respective pilot valve, release valve, and application valve.

Service valve device 28 further comprises a compensating piston abutment 60, on one side of which is formed a pressure chamber 61, in which a light spring 62 is disposed to urge compensating piston abutment 60 into engagement with a caged spring 63 acting on the opposite side of the compensating piston. A stem 64 of compensating piston abutment 60 projects into chamber 50 in spaced-apart relationship with piston abutment 36.

Inshot valve device 33 comprises a diaphragm piston valve 65 that forms a chamber 66 on its upper side and cooperates with an annular valve seat 67 on its lower side to form a pressure chamber 68 about the periphery of the valve seat. Engageable with piston valve 65, on its underside, is a stem 69 that acts on one side of a spring loaded check valve element 70, that is normally disengaged from a stationary annular seat 71 under the influence of a spring 72 acting on the upper side of piston valve 65. Acting on the opposite side of check valve element 70 by way of a stem 73 is a load sensing piston 74.

Figure 3:
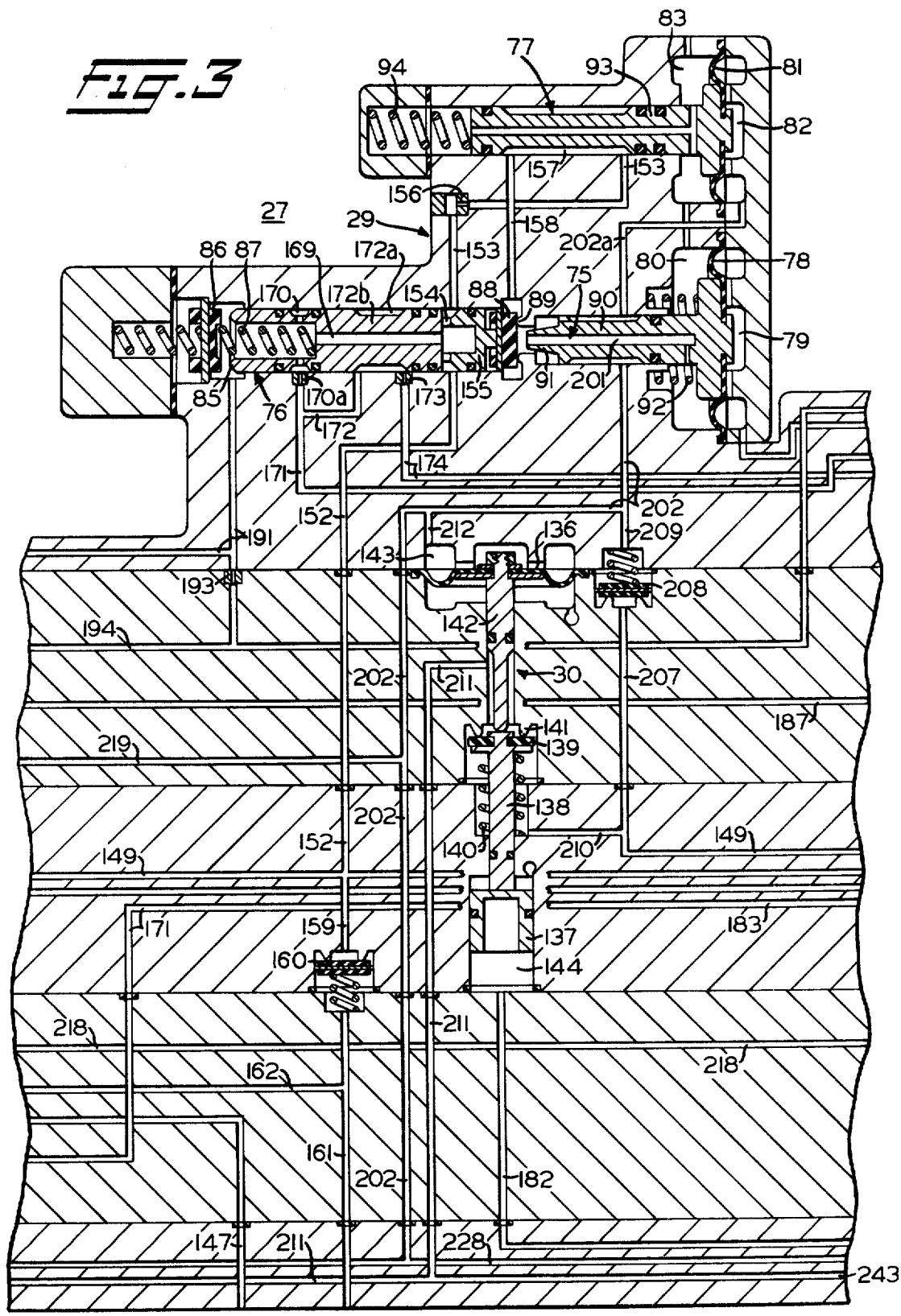

Application and release valve assembly 29 shown in FIG. 3 comprises a pilot operated exhaust control valve device 75, a charging valve device 76 operably engageable with valve device 75, and a quick service limiting valve device 77. Exhaust control valve device 75 is a poppet type valve having a diaphragm piston actuator 78, on opposite sides of which are formed a pilot chamber 79 and an atmospheric chamber 80, while charging valve 76 is a combination poppet and spool type valve. Quick service limiting valve device 77 is a spool type valve having a diaphragm piston actuator 81, on the opposite sides of which are formed a pilot chamber 82 and an atmospheric chamber 83.

Charging valve device 76 comprises a spool member 84, one end of which is formed with an annular valve seat 85 that is normally held in spaced-apart relationship with a spring loaded disc valve element 86 by a spring 87. At the opposite end of spool member 84 is a disc valve element 88 that is normally urged into engagement with an annular valve seat 89 formed on the casing. A stem 90 of piston 78 is formed at the end adjacent valve element 88 with an annular valve seat 91 that is normally held in spaced-apart relationship with valve element 88 by a spring 92 to form exhaust valve device 75.

Quick service limiting valve device 77 includes a spool valve member 93 formed on the stem of piston 81. A spring 94 biases the spool member in the position shown.

Figure 4:
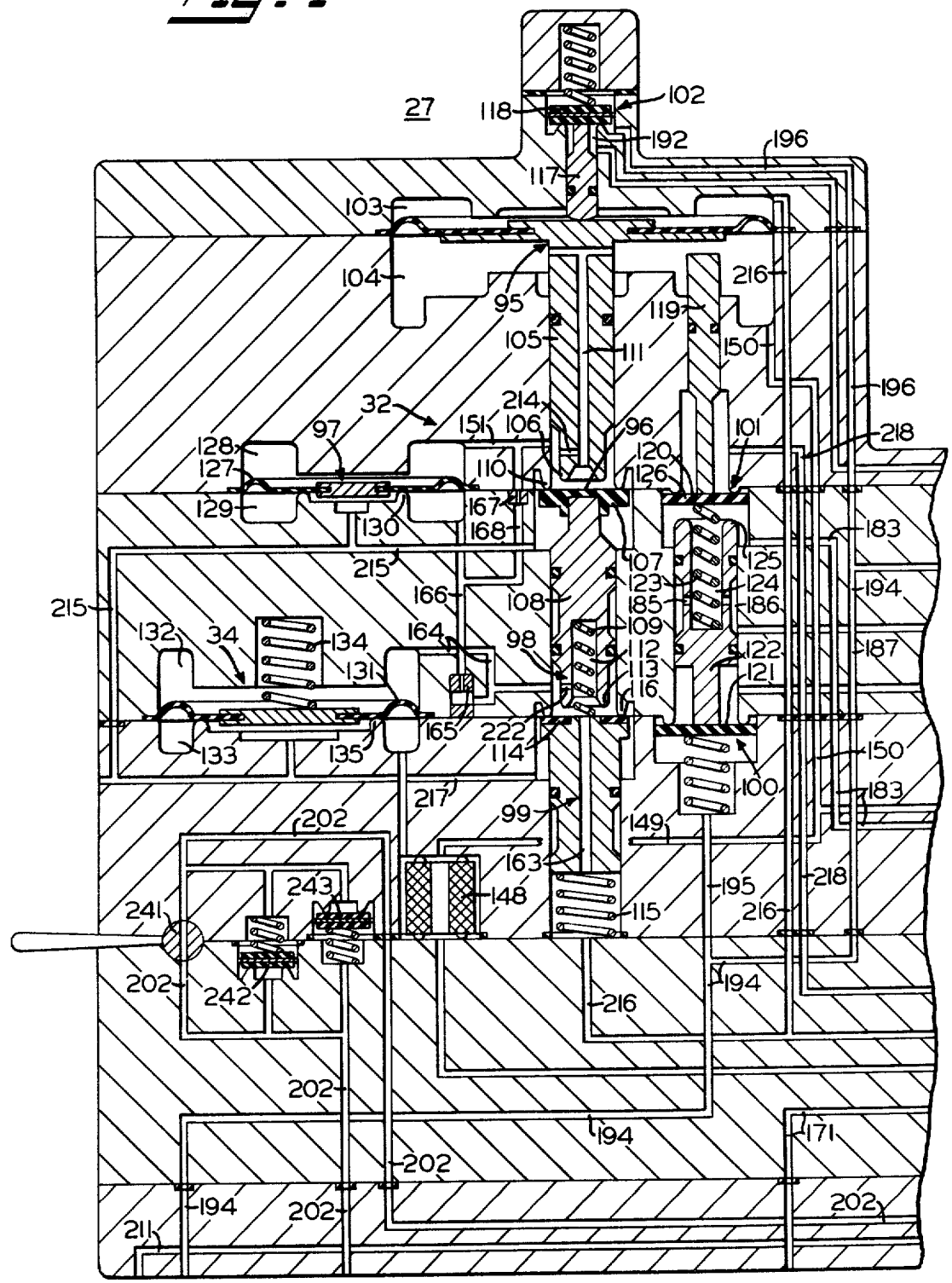

Combined quick service and emergency valve 32 shown in FIG. 4 comprises an emergency piston 95, an accelerated application valve 96, a quick action chamber breather valve 97, a breather cut-off valve 98, a vent valve pilot valve 99, an emergency application valve 100, a high pressure valve 101, and an accelerated release valve 102.

Emergency piston 95 forms on opposite sides thereof a pair of pressure chambers 103, 104. A stem 105 of piston 95 is formed with an annular valve seat 106 that is normally spaced apart from an annular disc valve 107 carried at one end of a member 108. A spring 109 acts on member 108 to maintain disc valve 107 in engagement with a stationary valve seat 110 that is concentric with valve seat 106. Stem 105 is further formed with a central passage 111 that extends between valve seat 106 and pressure chamber 104. The other end of member 108 is formed with a blind cavity 112 that houses spring 109. Cavity 112 terminates in an annular valve seat 113 of breather cut-off valve 98, and is normally spaced-apart from a disc valve 114 carried on pilot valve 99. A spring 115 acts on pilot valve 99 to normally urge disc valve 114 toward engagement with a stationary valve seat 116 that is concentric with valve seat 113.

A pusher pin 117 acts between one side of piston 95 and a spring loaded check valve 118 comprising accelerated release valve 102. A pusher pin 119 acts between the other side of piston 95 and a spring loaded check valve 120 comprising emergency application valve 101. Another spring loaded check valve 121 comprising high pressure valve 100 is spaced-apart from check valve 120, there being a pusher pin 122 therebetween. A spring 123 is housed in a blind cavity 124 of pusher pin 122 to provide the spring load on check valve 120. The open end of cavity 124 forms an annular valve seat 125 that is normally spaced-apart from a double-faced sealing element 126 of check valve 120 and is engageable therewith when check valve seal element 126 is displaced from its normally seated position.

Quick action breather valve 97 comprises a differential diaphragm piston valve 127 that forms pressure chambers 128 and 129 on its opposite sides, and cooperates with an annular valve seat 130 to delimit chamber 129.

Vent valve device 34, also shown in FIG. 4, comprises a differential diaphragm piston valve 131 that forms pressure chambers 132 and 133 on its opposite sides. A spring 134 in chamber 132 acts on piston valve 131 to normally maintain engagement thereof with an annular valve seat 135 to delimit chamber 133.

Transfer valve device 30, shown in FIG. 3, comprises a pair of opposing pistons 136 and 137. A stem 138 of piston 137 carries a disc valve element 139 that is urged by a spring 140 toward engagement with a stationary annular valve seat 141. A stem 142 of piston 136 is arranged to abut the end of stem 138. Piston 136 forms a pressure chamber 143 on one side, while piston 137 forms a pressure chamber 144 on the side thereof opposite the pressure chamber side of piston 136. Each piston 136 and 137 forms an atmospheric chamber on the side thereof opposite the respective pressure chambers 143 and 144. These pistons 136 and 137 thus act opposingly to control engagement and disengagement of valve element 139 with seat 141, and have differential effective pressure areas.

INITIAL CHARGING

During initial charging, compressed air is delivered to the train brake pipe at a predetermined pressure, and is connected by a branch pipe 20 at each car of the train to a port 147 of control valve device 27 leading to a brake pipe air strainer 148. From the cavity housing strainer 148, air flows in bypass of strainer 148 to vent valve chamber 106 where it acts on a small area of diaphragm piston valve 131, which remains seated by spring 107. At the same time, strainer air passes by way of a passage 149 to chambers 44 and 50 of service valve 28, and via a branch passage 150 of passage 149 to chamber 104 of emergency piston 95. This pressure acting on the underside of piston 95 raises the piston to disengage valve seat 106 from disc valve 107. From chamber 104, air flows via a central passage 111, open valve 106/107, and a passage 151 to chamber 128 of quick action chamber breather valve device 97, to cause engagement of diaphragm valve 127 with seat 130.

Another branch 152 of passage 149 delivers brake pipe air to a passage 153 via a cross passage 154 in a quick service valve member 155 on which disc valve element 88 is mounted. A quick service choke 156 conducts the flow of air in passage 153 to an annular groove 157 in spool member 93 of the quick service limiting valve 77 and thence to a passage 158 leading to seated valve 88/89 of the charging valve.

Another branch 159 of passage 149 concurrently connects air via a check valve 160 to a passage 161 leading to the quick action chamber 19. From passage 161, a branch passage 162 connects air from the quick action chamber 19 to the underside of pilot valve 99 and via a central passage 163 therein to breather cut-off valve 98. Being maintained open by virtue of spring 109, breaker cut-off valve 98 connects quick action chamber air to chamber 132 of vent valve device 34 via a passage 164 to maintain the vent valve device seated, and also to chamber 129 of breaker valve device 97 via a breather choke 165 in a branch 166 of passage 164. A quick action chamber charging choke 167 in a branch passage 168 between passages 151 and 166 provides the final charge of quick action chamber pressure from brake pipe pressure via the unseated accelerated application valve 96 following closure of charging check valve 160, as the brake pipe/quick action chamber pressure differential approaches equalization.

At charging valve 76, brake pipe air under pressure also flows via a central passage 169, an annular groove 170, a charging choke 170a, and a passage 171 leading to brake application chamber 10 of brake cylinder device 1, while concurrently compressed air in passage 171 is connected via a branch passage 172, an annular groove 172a in a spool member 172b of charging valve device 76, a release control choke 173 and a passage 174 leading to brake release chamber 11 of brake cylinder device 1. As chambers 10 and 11 are charged concurrently, return spring 15 is effective to force power piston 9 into engagement with its stop provided by wall 5 to establish release of the brakes.

Concurrently, the air in chamber 10 is also connected from passage 171 to chamber 43 of service valve device 28 via a branch passage 175, to a leakage compensating check valve 176 via a branch passage 177, and to a high capacity check valve 178 via a branch passage 179.

Also, the air in brake release chamber 11 is connected from passage 174 to chamber 49 of the service valve piston assembly 28 via parallel branch passages 180 and 180a, to high capacity check valve 178 via branch passage 181, to the underside of piston 137 via branch passage 182, and to cavity 124 of emergency application valve 101 via branch passage 183 and open valve 125/126. Air in cavity 124 flows via ports 185 and an annular groove 186 in pusher pin 122 to a passage 187 leading to a timing volume 188. A branch passage 189 connects the timing volume air to chamber 68 where it acts on the underside of piston valve 75 of inshot valve device 33. A branch passage 190 connects air from passage 174 to the upper side of piston valve 65 where it cooperates with spring 72 to maintain the piston valve diaphragm in engagement with seat 67 against the opposing force of timing volume pressure in chamber 68.

With charging valve 76 positioned as shown, brake pipe air in central passage 169 is also connected past open valve 85/86 to a passage 191 leading to an annular groove 192 in pusher pin 117. From passage 191, brake pipe air also flows to emergency pressure chamber 17 via a choke 193 and a passage 194. As emergency pressure chamber 17 is charged, this air in pressure 194 also flows to the underside of the high pressure valve 100 via a branch passage 195, to the upper side of the accelerated release valve 102 via a branch passage 196, to the underside of leakage compensating check valve 176 via a branch passage 197, and to the inner seated area of valve 39/40 of the application/release pilot valve 41 via a branch passage 198.

SERVICE BRAKE APPLICATION

In order to effect a service brake application, the air pressure in the train brake pipe is reduced at a service rate by the train operator in accordance with the degree of braking desired, such being conventional, well-known practice in train brake control operation. The reduction of brake pipe pressure is transmitted to each car control valve device 27 via the respective car branch pipe 20, which is connected to passage 147 of control valve device 27. Accordingly, the brake pipe pressure reduction is registered at chambers 44 and 50 of the service valve device 28, thereby creating a pressure differential across piston abutments 35 and 36 sufficient to effect a downward movement of the service valve piston stack from its normal brake release position in which it is maintained during initial charging toward an application position. Initial downward movement first causes engagement of application/release pilot valve seal ring 40 with valve seat 42 to cut off fluid pressure communication between a pilot control passage 199 and an exhaust passage 200, while concurrently causing disengagement of valve seat 39 from seal ring 40, to in turn establish fluid pressure communication between branch passage 198 and pilot control passage 199. Consequently, air under pressure in emergency chamber 17 of brake cylinder device 1 is supplied to pilot chamber 79 of exhaust control valve device 75 to move diaphragm piston 78 thereof leftward against its spring 92. Valve seat 91 on stem 90 engages disc valve 88 to close off the atmospheric connection via a central passage 201 in stem 90, while unseating disc valve 88 from its seat 89. This establishes fluid pressure communication between passage 158 and a passage 202 leading to the brake cylinder positioning chamber 8, thus establishing a local quick service reduction of brake pipe pressure via quick service limiting valve device 77.

This leftward movement of exhaust control valve device 75 is transferred to charging valve device 76 via quick service valve member 155 to also shift charging valve 76 leftward. In its leftward-most position, the charging valve spool cuts off charging of the brake cylinder application chamber 10 via charging choke 170, and also cuts off pressure communication between application chamber 10 and release chamber 11 via release control choke 173. Also, valve seat 85 formed at the end of spool member 172b engages valve element 86 to cut off brake pipe pressure from the brake cylinder emergency chamber 17 via choke 193.

Thus, system charging is terminated and a local quick service reduction of brake pipe pressure is obtained by connecting brake pipe pressure to positioning chamber 8 via spool groove 157 in limiting valve 77 and past open valve 88/89 during the initial phase of a serivce brake application, to accelerate the brake pipe reduction through the train. It will be seen that this quick service function is activated only during the initial brake application following a brake release, and assures continued deflection of the service valve piston stack toward application position.

This quick service pressure in chamber 8 is registered in pilot chamber 82 of limiting valve 77 via passage 202, the spool cavity of exhaust control valve 75, and a passage 202a. When the air chamber 8 and thus in pilot chamber 82 reaches a predetermined value, piston 81 is activated to cut off the quick service connection of brake pipe pressure via annular groove 157 of spool valve 93 and thus terminates this initial quick service operation.

As movement of the service valve piston stack continues toward application position, seal ring 54 of stability valve member 53 is subsequently engaged with valve seat 55 to cut off fluid pressure communication between chambers 49 and 50 via stability choke 48 and central passage 47, it being understood that the stability choke serves to dissipate brake pipe pressure fluctuations to permit undesired brake releases.

Continued movement of the piston stack finally causes shoulder 59 of stem 52 to engage graduated application valve member 56 and move the valve member to thereby disengage valve seal ring 57 from its seat 58. This connects branch 180a of passage 174 and a passage 203. Consequently, pressure in brake cylinder release chamber 11 is connected to brake cylinder positioning chamber 8 via passages 174, 180a and 203, the normally seated diaphragm piston valve 204 of a service limiting check valve device 205, a passage 206, the unseated va!ve 70/71 of inshot valve device 33, a passage 207, a one-way check valve 208, and a branch passage 209 of passage 202, where it combines with quick service pressure.

Accordingly, pressure in brake cylinder release chamber 11 is connected to brake cylinder positioning chamber 8 simultaneously with quick service pressure, as previously explained, to supply sufficient air pressure to chamber 8 to effect movement of brake cylinder pistons 7 and 9 in a brake application direction. During this movement of pistons 7 and 9 to brake application position, the pressure in brake cylinder release chamber 11 is connected to application chamber 10 via high capacity check valve 178, thereby allowing pressure equalization to take place therebetween to accommodate movement of piston 9, in light of the tendency for the pressure to rise in chamber 11 accompanying the volume reduction with piston displacement. Also, the pressure effective in positioning chamber 8 is connected via a branch passage 228 of passage 202 to chamber 61 of compensating piston 60 to thereby urge piston 60 and stem 64 into engagement with piston abutment 36 and accordingly bias the service valve piston stack upwardly toward brake release position, for a purpose hereinafter explained.

From passage 207, the pressure from brake cylinder release chamber 11 is also connected by a branch passage 210 to the underside of the normally closed valve 139/141 of transfer valve device 30, which normally cuts off this pressure from an exhaust passage 211 due to spring 140. The pressure developing in brake cylinder positioning chamber 8 is connected to chamber 143 of transfer valve device 30 via a branch passage 212 of passage 202, while the pressure in brake cylinder release chamber 11 is effective under piston 137 in chamber 144 to oppose the force exerted by piston 136. When the positioning chamber pressure effective in chamber 143 reaches a value sufficient to exert a force on piston 136 to overcome opposing forces of piston 137 and spring 140, valve element 139 is forced off its seat 141 to allow the release chamber air in passage 210 to flow to atmosphere via exhaust passage 211 and line 21 leading to empty/load changeover valve device 22. This opening of valve 139/141 upon actuation of transfer valve device 30 represents the "transfer point" discussed in the foregoing.

Following actuation of transfer valve device 30, check valve 208 is effective to prevent the backflow of pressure from brake cylinder chamber 8 to passage 210, since the exhausting brake cylinder pressure from chamber 11 is reduced to atmospheric pressure under check valve 208 via passage 207, so that the check valve closes.

As the air pressure in passages 210, 207, 206, 203, 180a, and 174 and thus the air in brake cylinder chamber 11 is reduced following actuation of transfer valve device 30, the piston movement having stopped, check valve 178 prevents the air in brake cylinder chamber 10 from back-flowing into chamber 11, thus establishing a pressure differential across power piston 9 to provide the brake application force desired.

In connecting the pressure in brake cylinder release chamber 11 to positioning chamber 8 prior to actuation of transfer valve device 30, it will be appreciated that only small pressure reduction initially occurs in chamber 11 due to its relatively large volume (in brake release position of piston 9), as compared to the considerably smaller volume of chamber 8. Accordingly, the pressure effective in chamber 144 of transfer valve device 30 closely reflects the level of pressure in brake cylinder chamber 11 at the time of a brake application, and thus establishes the level to which brake cylinder chamber 8 must be pressurized to operate transfer valve device 30, that is, to unseat valve 139/141 and establish the "transfer point" of transfer valve device 30. Consequently, the higher the pressure in release chamber 11 of brake cylinder device 1, the higher the pressure required in positioning chamber 8 to establish the "transfer point." It will be appreciated, therefore, that on one hand a relatively high pressure existing in release chamber 11 when a brake application is initiated requires a relatively high pressure in positioning chamber 8 to actuate transfer valve device 30. The higher the pressure in positioning chamber 8, the better likelihood of the dual piston assembly moving to application position before air is exhausted from release chamber 11. On the other hand, a relatively low pressure existing in chamber 11 when a brake application is initiated requires only a relatively low pressure in positioning chamber 8 to actuate transfer valve device 30. While this lower pressure in positioning chamber 8 offers less likelihood of complete movement of the dual piston assembly to application position before air is exhausted from release chamber 11, a brake application force is nevertheless realized, whereas a transfer valve having a single "transfer point" set for a relatively high pressure could fail to actuate at low positioning chamber pressures and thus would preclude the obtaining of any brake application force from the power piston 9 whatsoever.

In FIG. 5 of the drawings is shown an alternate embodiment of a transfer valve device 30', which comprises a differential diaphragm piston 230 and a pusher pin 231 having engagement at one end with piston 230 and at its opposite end with a disc valve element 232 that is biased by a spring 233 toward engagement with an annular valve seat 234. Formed on one side of piston 230 is a chamber 235 to which fluid pressure in brake cylinder chamber 10 is connected via passage 171. On the other side of piston 230 is formed a chamber 236 to which fluid pressure is connected from brake cylinder chamber 11 via passage 182. A stem 237 of piston 230 extends from the upper side of the piston for engagement with a disc valve element 238 that is biased toward engagement with an annular valve seat 239 by a spring 240.

As previously explained, pressure in brake cylinder chambers 10 and 11 equalize during movement of the brake cylinder dual piston assembly toward brake application position via high capacity check valve 178. As long as piston movement continues, increasing the volume of chamber 10 and decreasing the volume of chamber 11, chamber 11 pressure cannot drop below that of chamber 10. When brake cylinder piston movement to application position stops, the pressure in brake cylinder release chamber 11 is reduced by continued equalization with brake cylinder positioning chamber 8, while the pressure in application chamber 10 remains constant, thus causing an increasing pressure differential across power piston 9 to produce braking force. Since transfer valve device 30' is actuated in response to a predetermined pressure differential across diaphragm piston 230, which reflects the pressure differential between brake cylinder chambers 10 and 11, it follows that operation of this alternate transfer valve device 30' is withheld for a certain duration after movement of the dual brake cylinder piston has stopped. Upon actuation of transfer valve device 30', valve element 232 is unseated by pusher pin 231, thereby exhausting pressure in brake cylinder chamber 11 and accordingly terminating pressurization of chamber 8 via check valve 208 in a manner similar to transfer valve device 230. Although actuation of transfer valve device 230' is predicated upon termination of the dual piston movement toward brake application position, it still cannot be assured that complete piston movement has actually occurred before the pressure in release chamber 11 is exhausted, since excessive rigging friction may restrict piston movement.

In order to provide better assurance that complete piston movement toward brake application position has occurred prior to the air in brake cylinder chamber 11 being exhausted, the predetermined pressure differential required to actuate transfer valve 30' is initially set relatively high. In order to provide a variable "transfer point" for the reasons previously discussed, a greater pressure area is provided on the underside of differential area piston 230 than on its upper side. Thus, the pressure in brake cylinder release chamber 11 acting on the underside of piston 230 must be reduced by a predetermined percentage of the pressure in chamber 10 acting on the upper side, in order to actuate the transfer valve device 30' and thereby establish its "transfer point". It will be appreciated therefore that the actual pressure reduction in brake cylinder release chamber 10 required to actuate the transfer valve and establish its "transfer point" varies directly with the pressure existing in release chamber 10 when a brake application is made. Therefore, transfer valve device 30' actuates at a lower "transfer point" as the release chamber pressure decreases, thus assuring transfer valve operation and consequent development of braking force with maximum pneumatic efficiency with different levels of brake pipe charge.

In the actuated position of transfer valve device 30', valve element 238 is forced into engagement with seat 239 by its bias spring 240, thereby trapping the pressure in brake cylinder positioning chamber 8. This assures that during release of a brake application, the pressure in chamber 8 is not released until transfer valve 30' resets, the purpose being to assure that, in the event a reapplication is made before the transfer valve has reset, pressure is maintained in positioning chamber 8 to hold the dual piston assembly in brake application position. It is particularly critical, when a reapplication is made at the time the brake cylinder dual piston has already begun to move toward brake release position, that the transfer valve has already reset, thus permitting repressurization of positioning piston chamber 8 to effect movement of the dual piston back to brake application position against return spring 15.

Depending on the car load condition, empty/load changeover valve device 22 shown in FIG. 1 may be set to exhaust the air in exhaust line 21 directly via the exhaust porting in valve device 23, or via one-way check valve device 26, which retains the exhausting release chamber pressure at a predetermined value.

Under empty car conditions, sensing arm 25 engages the lower member of actuator 24 to set the two-position valve of changeover valve device 22 to its lower position in which the exhaust pressure in line 21 is exhausted via check valve 26. The pressure reduction in chamber 11 is therefore limited under empty car conditions in accordance with the spring loading of check valve 26 to in turn limit the brake force differential developed across power piston 9 and thereby establish reduced brake force.

Under load car conditions, sensing arm 25 engages the upper member of actuator 24 to set three-way valve device 23 to its upper position in which the exhaust pressure in line 21 is cut-off from check valve 26 and is connected directly to atmosphere, whereby complete release of the exhausting release chamber air can be attained to establish normal maximum brake force development.

In the alternate embodiment of the empty/load valve arrangement in FIG. 6, the one outlet of valve device 23 is blanked and check valve 23 is placed either in a branch 21a of exhaust line 21, as shown, or in a branch of control valve passage 211. By placing check valve 26 near the upstream end of line 21, any buildup of exhaust pressure in line 21, due to the restriction of a long pipe, is alleviated by reason of check valve 26 relieving this pressure up to its pressure retention setting, regardless of the empty or load setting of changeover valve 22. The arrangement has particular utility during emergency brake applications when high pressure valve 101 operates in parallel with the service valve 28, as hereinafter explained, to provide a high capacity exhaust of release chamber pressure. In a load condition, changeover valve 22 is set in its upper position in which exhaust line 21 is vented via the changeover valve, with check valve 26 being effective to relieve any pressure buildup exceeding the check valve setting. In an empty condition, changeover valve 22 is set in its lower position in which exhaust line 21 is blanked, thus forcing the back pressure to exhaust via check valve 26 which is effective to retain a predetermined pressure in exhaust line 21 and in release chamber 11, thereby establishing an empty car brake force that is less than the normal braking force established under a loaded car condition.

As the pressure in brake cylinder chamber 11 continues to exhaust, a pressure reduction is reflected in chamber 49 of service valve device 28. When this pressure is reduced below brake pipe pressure enough to create an upward acting force differential across piston abutment 36 combined with the upward acting force exerted by compensating piston 60, sufficient to counteract the existing downward acting force differential across piston abutment 35, a force balance is restored sufficient to allow the piston stack to move upward to a lap position between the application and release positions. In lap position, seal ring 57 is re-engaged with seat 56 to terminate any further exhaust of pressure from brake cylinder release chamber 11. In that the differential pressure area of piston abutment 35 is greater than the differential pressure area of abutment 36, a certain ratio of chamber 11 pressure reduction to brake pipe pressure reduction is obtained, such as for example 4.5:1.

The function of compensating piston 60 during the foregoing brake application will now be discussed. As previously explained, fluid pressure in brake cylinder release chamber 11 is initially connected to brake cylinder positioning chamber 8, thereby effecting movement of the brake cylinder piston assembly to brake application position. As also previously explained, transfer valve device 30 or 30' is set to actuate at a sufficiently high "transfer point" to assure complete movement of the piston assembly to brake application position before the transfer function takes place. Since the pressure in brake cylinder application chamber 10 becomes fixed following completion of the piston stroke, the reduced pressure in release chamber 11, due to its connection to chamber 8 prior to transfer establishes a pressure differential across power piston 9. Concurrently, the pressure developed in chamber 8 acts on positioning piston 7, so that a braking force is produced in accordance with the effective pressure acting on the respective pistons 7 and 9. At the same time, the service piston stack is kept in force balance with reducing brake pipe pressure by both a reduction of pressure in chamber 49 formed by piston abutment 36 and an increase of pressure in chamber 61 formed by compensating piston abutment 60.

Once the pressure in positioning chamber 8 reaches a value corresponding to the selected "transfer point", transfer valve device 30 is actuated to cut-off further pressurization of chamber 8 by its connection with chamber 11 and to exhaust the pressure in release chamber 11 to atmosphere. Thus, for each additional increment of brake pipe pressure reduction following operation of the transfer valve device 30, the only additional brake cylinder push rod force increase results from the increased pressure differential across power piston 9. It will be obvious, therefore, that in order to obtain braking forces that continue to be linear with respect to the brake forces developed prior to the transfer function, or, continuously proportional to the brake pipe pressure reduction, a greater reduction of pressure in release chamber 11 is required for each additional increment of brake pipe pressure reduction after the transfer point. This is accomplished by reason of the fact that the pressure in positioning chamber 8 and thus in chamber 61 formed by compensating piston 60 remains constant at the level attained prior to operation of transfer valve device 30, so that the bias force exerted by compensating piston abutment 60 remains constant. Consequently, for the same increment of brake pipe pressure reduction after the "transfer point" as before, a greater reduction of pressure is required in release chamber 11 to balance the service piston stack and cause the stack to move to lap position. This greater reduction of release chamber pressure produces a greater pressure differential across power piston 9 for each increment of brake pipe pressure reduction making up for the lack of additional pressure buildup on the positioning piston, so that the brake force buildup after the transfer function is substantially linear with the brake force buildup achieved prior to the transfer function, with respect to the brake pipe pressure reduction.

Spring 63 is caged so as to be "picked up" by compensating piston 60 during movement from lap position of service valve device 28 to release position. This increased spring load provides the desired brake release control characteristic, without affecting the compensating function of piston 60, as hereinbefore explained.

Service limiting check valve 205 between passages 203 and 206 is spring loaded to limit the maximum reduction of pressure in chamber 11 that can be made by service valve device 28.

During the aforementioned brake application, combined quick service and emergency valve 32 is operative to provide continuous quick service activity, as well as service stability against undesired emergency brake applications. As the brake pipe pressure is being reduced, a pressure reduction is reflected in chamber 104 of emergency piston 95. Since quick action chamber pressure in opposing chamber 103 remains relatively constant, due to charging choke 167 restricting the backflow of quick action chamber pressure to the brake pipe, a force differential is created across emergency piston 95, by the resultant preponderance of quick action chamber pressure in chamber 103, to move the emergency piston downwardly until the seat 106 on piston stem 105 engages the accelerated application valve 96.

At very slow rates of brake pipe reduction, the force of movement of piston 95 is insufficient to actuate accelerated application valve 96 against its spring 109. Therefore, the brake pipe pressure in chamber 128 of breather valve 97 is exhausted via passage 151, an accelerated application choke 214, and central passage 111 in piston stem 105. Since the quick action chamber pressure in chamber 129 of breather valve 97 is able to follow this low rate of brake pipe pressure reduction via charging choke 167, insufficient pressure differential develops across the breather valve diaphragm piston valve 127 to effect disengagement thereof from seat 130. Accordingly, emergency piston 95 is stabilized and quick action chamber breather valve 97 remains in the position shown, wherein no quick service venting of brake pipe pressure occurs.

At higher service rates of brake pipe reduction, a higher pressure differential is developed across piston 95, which moves the piston downwardly with sufficient force to overcome spring 109 and thereby actuate accelerated application valve 96, whereby valve 107-110 is opened, and valve 107-106 is closed. Accordingly, brake pipe pressure in chamber 128 of breather valve 97 is isolated from brake pipe pressure by means of valve 107-106 and is rapidly exhausted via passage 151, open valve 107-110, and an exhaust passage 215, so as to be exhausted independently of brake pipe pressure in the train brake pipe, and at a much faster rate. Due to the restriction provided by charging choke 167, quick action chamber pressure in chamber 129 is unable to follow the reduction of pressure in chamber 128, so that a pressure differential is developed across diaphragm piston valve 127 sufficient to effect disengagement thereof from seat 130. When this occurs, the entire underside of diaphragm piston valve 127 is exposed to quick action chamber pressure to obtain positive unseating of diaphragm piston valve 127 with snap action. Quick action chamber pressure effective in chamber 103 of the emergency piston 95 is thus exhausted via passage 216, the chamber housing spring 115, central passage 163 in pilot valve 99, open valve 113-114, passage 164, breather choke 165, passage 166, the unseated breather valve diaphragm piston valve 127, and exhaust passage 215, thus rapidly reducing the quick action pressure and reversing the pressure differential across emergency piston 73 to cause the emergency piston to return to its normal position, without having been moved sufficiently to trigger an emergency brake application, as hereinafter explained. In the normal position of the emergency piston, valve 107-110 is closed and valve 107-106 is opened, thus re-establishing fluid pressure communication between the brake pipe and chamber 128. As chamber 128 is thus recharged, breather valve diaphragm piston valve 127 is reset and a further local brake pipe pressure reduction takes place to supplement the reduction effective at the brake pipe and to thereby accelerate the overall service brake pipe pressure reduction and therefore the service application throughout the train.

As long as this service reduction of brake pipe pressure continues, emergency piston 95 will continue to cycle in rapid succession without attaining sufficient deflection to actuate vent valve pilot valve 99. The cycling action, however, will effect continuous, local quick service reductions of brake pipe pressure.

EMERGENCY BRAKE APPLICATION

In the event an emergency rate of brake pipe reduction is made, the rate of reduction of quick action chamber pressure via breather choke 165 is insufficient to reverse the pressure differential producing downward movement of emergency piston 95, which is accordingly deflected sufficiently to cause member 108 of breather cut-off valve 98 to engage pilot valve 99. When this occurs, valve 113-114 closes to terminate "breathing" of quick action chamber pressure via central passage 163 in pilot valve 99. At the same time, valve 114-116 is opened. Quick action chamber pressure in chamber 132 of vent valve device 34 is thus vented to atmosphere first through passage 164, breather choke 165, passages 166 and 215 and then via passage 164, open valve 114-116, and a passage 217 leading to exhaust passage 215. The predominant brake pipe pressure in chamber 133 below differential diaphragm piston valve 131 of vent valve device 34 unseats the diaphragm from valve seat 135 to thereby connect brake pipe pressure to atmosphere via passages 217 and 215 and accordingly effect a rapid local reduction of brake pipe pressure to propagate the emergency venting of brake pipe pressure via the train brake pipe.

In the fully applied position of emergency piston 95, pusher pin 119 is operated to actuate high pressure valve 101, which in turn actuates emergency equalization valve 100. Actuation of high pressure valve 101 disengages seal ring 126 thereof from its valve seat, to thereby exhaust pressure in brake cylinder chamber 11 via passage 174, 183, open valve 126, a passage 218, open valve 70-71 of inshot valve 33, passages 207 and 210, open valve 139-141 of transfer valve device 30, and exhaust passage 211. This occurs in parallel with the exhaust of chamber 11 via the service valve 28, etc. It will thus be seen that during emergency, the exhaust of pressure from brake cylinder chamber 11 takes place in bypass of service limiting check valve 205 to provide a further emergency reduction of pressure in chamber 11, depleting it, in fact, to atmospheric pressure, as compared to the level of reduction made during a service brake application. Consequently, a greater pressure differential is produced across power piston 9 during emergency, and thus a higher braking force is achieved.

This higher braking force produced by power piston 9 during emergency is supplemented by a higher force produced by positioning piston 7, as well. Actuation of emergency equalization valve 100 results in emergency reservoir pressure being connected to brake cylinder chamber 8 via passage 194, open valve 121, a passage 219, and a passage 202. Emergency reservoir pressure thus supplements the normal service application pressure effective in chamber 8. Consequently, positioning piston 7 exerts a predetermined higher brake force during emergency than during service braking.

In accordance with the foregoing explanation relative to accomplishing an emergency brake application, it will be noted that the emergency reduction of brake cylinder chamber 11 takes place via inshot valve device 33. The purpose of this inshot valve is to control the emergency buildup of brake forces through a train in accordance with a predetermined profile, in order to optimize interaction between the cars of the train by reducing draft gear forces without sacrificing train stopping distance. The emergency brake forces are controlled by controlling the exhaust of pressure from brake cylinder chamber 11 via service valve 28 and emergency valve 32, so as to initially provide rapid run-in of slack between the car couplers, holding the brake forces relatively constant for a certain delay period to assure that the train slack is sufficiently "bunched", and then providing a further rapid build-up of brake forces to preserve stopping distance.

When an emergency brake application is initiated, by reason of an emergency rate of brake pipe pressure reduction, both the service valve 28 and the emergency valve 32 are operative, as heretofore explained to exhaust fluid pressure from brake cylinder chamber 11 via inshot valve 33, it being understood that equal pressure initially exists in inshot valve chambers 66 and 68, such pressures acting on essentially equal effective pressure areas of piston 65. Accordingly, bias spring 72 is effective to hold piston 65 in its downward-most position, in which stem 69 holds the inshot check valve 70-71 open, until such time as the force of spring 72 is overcome. During the first stage of emergency, maximum exhaust of pressure from brake cylinder chamber 11 is realized via open inshot check valve 70-71. In response to actuation of the high pressure valve 101 during emergency, valve 125-126 is closed to cut off fluid pressure communication between passages 183 and 187 and to thereby trap fluid pressure in chamber 68 and timing volume 188, at the pressure prevailing in chamber 11 when the emergency application occurs, while the pressure in chamber 66 is exhausting with the pressure in brake cylinder chamber 11. This creates an upward-acting pressure differential across piston 65 sufficient to overcome bias spring 72, when a predetermined reduction of pressure has occurred in brake cylinder chamber 11, as for example 30 psi. At this point, piston 65 is forced upward, allowing a spring 220 to close inshot check valve 70-71 and thereby temporarily terminate the exhaust of pressure from brake cylinder chamber 11. When piston 65 is forced upward, it is disengaged from its seat 67 to expose the entire underside of piston 65 to timing volume pressure and thereby obtain snap action of piston movement and positive, sudden closure of inshot check valve 70-71, while concurrently connecting pressure in timing volume 188 to atmosphere via a timing choke 221. This latter operation establishes a timing period which represents a second phase of the emergency operation, during which the inshot check valve remains closed to terminate further exhaust of pressure from brake cylinder chamber 11 and accordingly effect a holding of the brake forces essentially constant, although a gradual increase in braking force occurs during this phase due to the gradual buildup of fluid pressure in chamber 8 from emergency chamber 17, as previously described. When the timing volume pressure is decreased sufficiently to allow spring 72 and the remaining fluid pressure force in chamber 66 to reset piston 65 on seat 67, stem 69 is concurrently effective to again open inshot check valve 70-71 and reestablish the exhaust of pressure from brake cylinder chamber 11, to thereby obtain a further increase of the brake force. It is to be understood, that service limiting check valve 205 cuts off exhaust of pressure from chamber 11 at a predetermined full service value, but the emergency valve high pressure valve 101 remains effective to completely vent chamber 11 pressure.

As previously explained, empty/load changeover valve device 22 operates under empty car conditions to limit the exhaust of pressure from release chamber 11 during a brake application to reduce the degree of braking on an empty car. The pressure thus trapped in exhaust line 21 and exhaust passage 211 builds up under load sensing piston 74 of inshot valve device 33 via branch passage 243, thereby adding an upward force on the inshot valve check valve 70, which increases with the degree of release chamber pressure exhausted in excess of the limit pressure established by retaining check valve 26. Thus, the three-stage emergency brake pressure build-up is modulated in proportion to the back pressure acting on sensing piston 74.

RELEASE AFTER SERVICE BRAKE APPLICATION

With the servie valve piston stack 28 in lap position following a service brake application, as hereinbefore discussed, a brake pipe pressure increase, due to a pressure fluctuation, will raise piston abutment 36 sufficiently to raise release stability valve member 53 and thereby dissipate the brake pipe pressure fluctuation via stability choke 48 and open valve 54-55, slightly reducing the effective brake pipe pressure and slightly increasing the fluid pressure prevailing in chamber 49 to stabilize the service valve stack and prevent an undesired release of the brake application.

In the event a bona fide increase of brake pipe pressure occurs incident to a desired release of the brake application, the rate of flow of brake pipe pressure via stability choke 48 will be insufficient to so stabilize the service valve 28 piston stack. Consequently, a pressure increase is developed in chamber 44 and 50, which creates an upward acting force imbalance on the piston stack of service valve 28 sufficient to raise the piston stack to release position and thereby unseat valve element 40 from its seat 42. Pilot pressure in chamber 79 of exhaust control valve device 75 is thus vented to atmosphere via passage 199, valve 40-42 and passage 200. This allows piston actuator 78 of exhaust control valve device 75 to be reset to release position by poppet valve return spring 92. In the reset position of piston actuator 78, charging valve 76 is also reset by its return spring 87. Valve 88-91 is thus open, valve 88-89 is closed, and valve 85-86 is open. The air in positioning chamber 8 is connected to atmosphere via passage 202, open valve 88-91, central passage 201 in exhaust control valve 75, and atmospheric chambers 80, 83. Air in pilot chamber 82 of quick service limiting valve 77 is also connected to atmosphere via passage 202a, the exhaust control valve spool cavity, open valve 88-91, central passage 201, and atmospheric chambers 80, 83. Spring 94 is thus effective to reset limiting valve 77 to the position shown, in which spool groove 157 re-connects passages 153 and 158 preparatory to another cycle of operation upon the next brake application following brake release. Closed valve 88-89 cuts-off brake pipe air in connected passages 153, 158 from flowing to brake cylinder positioning chamber 8, which is now vented, as above explained; open valve 85-86 re-establishes the brake pipe charging communication between passage 191 and 171, via which brake cylinder emergency chamber 10 is recharged; annular groove 170 re-establishes communication between central passage 169 of charging valve 76 and passage 171 via which brake cylinder chamber 10 is re-charged; and a branch passage 172 of passage 171 is communicated with passage 174 via spool groove 172a to re-charge brake cylinder chamber 11.

The pressure in brake cylinder chambers 10 and 11 equalizes through choke 173 at a controlled rate, and brake cylinder spring 15 is then effective to move the brake cylinder dual-piston 7, 9 to brake release position.

During this aforementioned brake release operation, accelerated release valve 102 is actuated by movement of the emergency piston 95 to its upper-most position, in response to the pressure differential created across piston 95 by the increase of brake pipe pressure in chamber 104. Accordingly, air in the brake cylinder emergency chamber 17 is connected into the brake pipe via passages 194 and 196, the open accelerated release valve element 118, passage 191, open valve 85-86 of charging valve 76, central passage 169, passages 152, 149 and 147, and branch pipe 20. This effects a local increase in brake pipe pressure at each car to hasten the release of the brakes along the train.

OPTIONAL GRADUATED BRAKE RELEASE

In the event it is desired to obtain the ability to release the brakes gradually, as opposed to directly, it s only necessary to remove or increase the capacity of stability choke 48. Being of very small size, this stability choke normally permits a significant pressure differential to develop across piston abutment 36, to deflect the piston stack upwardly when brake pipe pressure is increased, in order to effect a direct release of the brakes, and additionally serves to dissipate spurious brake pipe fluctuations, without permitting a significant pressure differential to develop in response thereto, thereby preventing undesired brake operation.

With increased capacity or removal of choke 48, an increase in brake pipe pressure is registered in chamber 50 and is communicated to chamber 49 substantially unrestricted via central passage 47 in piston abutment 36. Because of the previously mentioned size ratio between piston abutments 35 and 36, a significantly greater change in pressure is required in chamber 49 relative to brake pipe pressure to sufficiently balance the service piston stack and accordingly prevent enough upward displacement of the service piston stack to effect unseating of valve element 40 from seat 42. Since, however, the pressure in chamber 49 and connected brake cylinder chamber 11 is substantially lower than the prevailing brake pipe pressure during a service application, it is possible for the flow of brake pipe pressure into chamber 49 to rapidly increase this pressure as required to prevent further upward movement of the service stack. Thus, application and release valve assembly 29 remains actuated by the pilot pressure trapped in passage 199 by reason of valve 40-42 remaining closed, so that a direct release of the brakes, as hereinbefore described, is withheld. However, chamber 49 is connected to brake cylinder chamber 11 to increase the pressure therein via open release valve 54-55, passage 180a, and passage 174, so as to decrease the pressure differential across the power piston 9 and thereby effect a degree of brake release.

As the pressure in chamber 49 consequently increases, an overall force balance is maintained across piston abutments 35 and 36, such that should the increase in brake pipe pressure be terminated, it will effect closure of release stability valve 54-55, thus maintaining the degree of brake release proportional to the degree of brake pipe pressure increase. In this manner, the brakes may be gradually released or reapplied, if desired.

When the brake pipe pressure as well as the pressure in chambers 49 and 11 have been recharged substantially to the prevailing pressure in chamber 43 and connected chamber 10, a return spring 15 will force the service piston stack to its release position, opening pilot exhaust valve 40-42 to allow application and release valve assembly 29, and subsequently transfer valve 28 to reset as explained with respect to direct release of the brakes, whereby normal system recharge will take place.

PRESSURE RETENTION DURING BRAKE RELEASE

Disposed in exhaust passage 202 is a handle operated rotary valve device 241, which can be manually operated to open or close passage 202. In the open position, normal supply and exhaust of pressure from brake cylinder positioning chamber 8 is provided, as hereinbefore explained. In the closed position, fluid pressure in chamber 8 is forced to exhaust via retainer check valve 242 in parallel with rotary valve device 241. Retainer check valve 242 is spring loaded to retain a predetermined level of fluid pressure in chamber 8 and thereby maintain a limited degree of braking force, as required when descending long grades in order to permit recharge of the brake equipment without actually effecting a complete brake release as normally occurs during recharge.

Another check valve 243 is arranged in parallel with retainer check valve 242 in order to accommodate supply of fluid pressure to brake cylinder chamber 8 when rotary valve device 241 is closed. Bypass check valve 243 checks the flow of fluid pressure in passage 202 in the opposite directions as retainer check valve 242, and permits reapplications of braking pressure to chamber 8 when the rotary valve 241 is closed.

RELEASE AFTER EMERGENCY BRAKE APPLICATION

Following an emergency brake application, the quick action chamber air effective in chamber 103 of emergency valve piston 95 is vented to atmosphere via passage 216, central passage 163 in vent valve pilot valve 99, a quick action chamber blowdown choke 222, open valve 114-116, and exhaust passage 217. Choke 222 is sized to control the rate of blowdown of the quick action chamber pressure, so as to establish approximately a 60 second time delay before complete blowdown can occur. During this delay period, quick action chamber pressure effective in chamber 103 holds emergency piston 95 in its downwardmost position, in which vent valve pilot valve 99 is held actuated to maintain its valve 114-116 open. Chamber 132 of vent valve device 34 is accordingly vented via passage 164 and the open valve 114-116, so that if recharge of brake pipe pressure is attempted during this delay period (which is imposed to assure efficient time to bring a train to a complete stop from an emergency application), the brake pipe pressure will simply blow to atmosphere via the unseated vent valve 135-131, and thus be ineffective in causing a brake release.

Once the imposed time delay is complete, vent valve pilot valve 99 is returned by spring 115 to its normal position, thus effecting closure of valve 114-116 and accordingly cutting off the vent valve chamber 132 from atmosphere. This permits the recharge of brake pipe pressure to build up in chamber 132 as the quick action chamber 19 is recharged, thereby effecting positive closure of vent valve device 34 by reason of the differential pressure area of piston valve 131 and spring 134.

MANUAL BRAKE RELEASE

A brake application may be released manually on an individual car by pulling a release handle 223 of the manual release valve 31 to activate a spring loaded member 224, which in turn lifts a valve element 225 off its seat 226. This allows air in brake cylinder application chamber 10 to be quickly released to atmosphere past the open valve 225-226 via passage 171, and a branch passage 227. High capacity check valve 178 allows air in brake cylinder release chamber 10 to follow this exhaust of application chamber air at manual release valve device 31, thereby destroying the brake force applying pressure differential across the brake cylinder 10 power piston 9. When the air in chambers 10 and 11 falls below brake pipe pressure, a force imbalance is created across the piston stack of service valve device 28 to shift it to release position, in which pilot pressure in passage 199 is exhausted. This causes exhaust control valve device 75 to reset and thereby release the air in brake cylinder positioning chamber 8 and accordingly remove the force acting on positioning piston 7. Return spring 15 is thus effective to force the dual-connected pistons 7 and 9 to a brake release position. Also, operation of the manual release valve 31 will not cause accelerated release to occur, since accelerated release valve 102 will remain closed without any accompanying increase of brake pipe pressure. Consequently, the brakes on an individual car of a train may be released without releasing the brakes on the other cars.

Having thus described the invention what I claim as new and desire to secure by Letters Patent, is:

1. Fluid pressure brake apparatus for a railway vehicle operative in response to variation of fluid under pressure in a brake pipe of said vehicle comprising:
   (a) a brake cylinder device having:
      (i) a power cylinder portion;
      (ii) a power piston operatively disposed in said power cylinder portion and cooperating therewith to form an application chamber on one side of said power piston and a release chamber on the opposite side thereof;
      (iii) a positioning cylinder portion;
      (iv) a positioning piston operatively disposed in said positioning cylinder portion for engagement with said power piston, said positioning piston cooperating with said positioning cylinder portion to form on one side thereof a positioning chamber;
      (v) biasing means for urging said power piston toward a brake release position; and
   (b) a control valve device including
      (i) an exhaust passage;
      (ii) charging valve means having a charging position in which said positioning chamber is vented and said application and release chambers are in fluid pressure communication with said brake pipe, whereby said bias means is effective to move said power piston to said brake release position and having a cut-off position in which said venting of said positioning chamber and said charging of said application and release chambers is interrupted;
      (iii) service valve means operable to an application position in response to a reduction of said brake pipe fluid under pressure for operating said charging valve means to said cut-off position and for conducting flow of fluid under pressure from said release chamber to said positioning chamber, said positioning piston and accordingly said power piston being movable from said brake release position to a brake application position when the fluid under pressure in said positioning chamber reaches a predetermined value; and
      (iv) transfer valve means operatively responsive to said release chamber fluid under pressure for establishing fluid pressure communication between said release chamber and said exhaust passage to thereby establish a pressure differential between said application and release chambers to cause said power piston to provide a braking force.

2. Fluid pressure brake apparatus as recited in claim 1, wherein said transfer valve means is responsive to a decrease in said release chamber fluid pressure.

3. Fluid pressure brake apparatus as recited in claim 2, wherein the amount of said decrease is proportional to said application chamber fluid pressure.

4. Fluid pressure brake apparatus as recited in claim 2, wherein the amount of said decrease is in excess of a predetermined amount and said decrease varies linearly with said application chamber fluid pressure.

5. Fluid pressure brake apparatus as recited in claim 2, further comprising means for providing fluid pressure communication between said release and application chambers only when the fluid pressure in said release chamber is greater than the fluid pressure in said application chamber.

6. Fluid pressure brake apparatus as recited in claim 2, wherein said transfer valve means comprises:
   (a) first valve means having an open position in which said flow of said release chamber fluid under pressure conducted to said positioning chamber is connected to said exhaust passage, and a closed position for cutting off said connection of said release chamber fluid pressure to said exhaust passage; and
   (b) differential area piston means subject opposingly to said fluid pressure in said release chamber and in said application chamber for operating said valve means to said open position when said flow of said release chamber fluid under pressure conducted to said positioning chamber reduces said release chamber pressure relative to said application chamber pressure said certain amount.

7. Fluid pressure brake apparatus as recited in claim 3, further comprising means for providing fluid pressure communication between said release and application chambers only when the fluid pressure in said release chamber is greater than the fluid pressure in said application chamber.

8. Fluid pressure brake apparatus as recited in claim 3, wherein said transfer valve means comprises:
   (a) first valve means having an open position in which said flow of said release chamber fluid under pressure conducted to said positioning chamber is connected to said exhaust passage, and a closed position for cutting off said connection of said release chamber fluid pressure to said exhaust passage; and
   (b) differential area piston means subject opposingly to said fluid pressure in said release chamber and in said application chamber for operating said valve means to said open position when said flow of said release chamber fluid under pressure conducted to said positioning chamber reduces said release chamber pressure relative to said application chamber pressure said certain amount.

9. Fluid pressure brake apparatus as recited in claim 4, further comprising means for providing fluid pressure communication between said release and application chambers only when the fluid pressure in said release chamber is greater than the fluid pressure in said application chamber.

10. Fluid pressure brake apparatus as recited in claim 4, wherein said transfer valve means comprises:
   (a) first valve means having an open position in which said flow of said release chamber fluid under pressure conducted to said positioning chamber is connected to said exhaust passage, and a closed position for cutting off said connection of said release chamber fluid pressure to said exhaust passage; and
   (b) differential area piston means subject opposingly to said fluid pressure in said release chamber and in said application chamber for operating said valve means to said open position when said flow of said release chamber fluid under pressure conducted to said positioning chamber reduces said release chamber pressure relative to said application chamber pressure said certain amount.

11. Fluid pressure brake apparatus as recited in claim 6, wherein said transfer valve means further comprises second valve means having an open and a closed position for accommodating said venting and interrupting said venting of said positioning chamber fluid under pressure respectively, said second valve means being maintained in said closed position when said first valve means is maintained in said open position by said differential area piston means.

12. Fluid pressure brake apparatus as recited in claim 8, wherein said transfer valve means further comprises second valve means having an open and a closed position for accommodating said venting and interrupting said venting of said positioning chamber fluid under pressure respectively, said second valve means being maintained in said closed position when said first valve means is maintained in said open position by said differential area piston means.

13. Fluid pressure brake apparatus as recited in claim 10, wherein said transfer valve means further comprises second valve means having an open and a closed position for accommodating said venting and interrupting said venting of said positioning chamber fluid under pressure respectively, said second valve means being maintained in said closed position when said first valve means is maintained in said open position by said differential area piston means.

14. Fluid pressure brake apparatus as recited in claim 1, wherein said operation of said transfer valve means is further responsive to said application chamber fluid pressure.

15. Fluid pressure brake apparatus as recited in claim 14, wherein said operation of said transfer valve means is responsive to a predetermined linear relationship between said release chamber fluid pressure and said application chamber fluid pressure.

16. Fluid pressure brake apparatus as recited in claim 1, further comprising:
   (a) a supply passage via which said release chamber fluid under pressure conducted by said service valve means is connected to said positioning chamber;
   (b) said transfer valve means being operative to establish said fluid pressure communication between said release chamber and said exhaust passage by connecting said supply passage to said exhaust passage; and
   (c) check valve means between said positioning chamber and said supply passage for preventing said positioning chamber fluid under pressure from flowing to said exhaust passage when said transfer valve means is operative.

17. Fluid pressure brake apparatus as recited in claim 1, further comprising biasing means for providing a force on said service valve means in a direction opposite to movement thereof to said application position, such biasing being variable prior to said actuation of said transfer valve means and constant thereafter.

18. Fluid pressure brake apparatus as recited in claim 17, wherein said biasing means is opposed from acting on said service valve means by spring means during movement of said service valve means in a direction opposite the direction of movement toward said application position, when said movement is in response to an increase of said brake pipe fluid pressure.

19. Fluid pressure brake apparatus as recited in claim 17, wherein such force provided by said biasing means is proportional to said fluid pressure in said positioning chamber.

20. Fluid pressure brake apparatus as recited in claim 17, further comprising means for selectively retaining a predetermined amount of fluid under pressure in said positioning chamber during said venting thereof in said charging position of said charging valve means.

21. Fluid pressure brake apparatus as recited in claim 19, wherein said biasing means comprises:
   (a) a compensating piston subject to said positioning chamber fluid pressure; and
   (b) a stem projecting from said piston into engagement with said service valve means whereby such force provided by said biasing means is transmitted to said service valve means.

22. Fluid pressure brake apparatus as recited in claim 20, wherein said retaining means comprises:
   (a) a manually operated valve having an open position in which fluid pressure communication is established between said control valve device and said positioning chamber and a closed position in which said fluid pressure communication is interrupted; and
   (b) a first one-way check valve in parallel with said manually operated valve via which fluid pressure is directed from said positioning chamber to provide said venting of said positioning chamber fluid pressure until said fluid pressure thereof is reduced to said predetermined amount when said manually operated valve is in said closed position; and
   (c) a second one-way check valve in parallel with said manually operated valve via which fluid pressure is directed to accommodate said supply of said release chamber fluid pressure to said positioning chamber when said manually operated valve is in said closed position.

23. Fluid pressure brake apparatus as recited in claim 21, further comprising spring means including:
   (a) a spring acting on said compensating piston in said application direction; and
   (b) means for caging said spring such that said spring is prevented from acting on said compensating piston during movement of said service valve means in a direction opposite the direction of movement toward said application position when said movement is in response to an increased pressure of said brake pipe fluid pressure.

24. Fluid pressure brake apparatus as recited in claim 1, further comprising means for modulating said braking force provided by said power piston according to the condition of loading of said railway vehicle.

25. Fluid pressure brake apparatus as recited in claim 24, wherein said modulating means comprises:
  (a) check valve means for venting said exhaust passage of said release chamber fluid pressure in excess of a predetermined amount; and
  (b) changeover valve means having first and second positions for connecting said exhaust passage to atmosphere directly when said vehicle is in a load condition and connecting said exhaust passage to atmosphere via said check valve means when said vehicle is in an empty condition.

26. Fluid pressure brake apparatus as recited in claim 25, further comprising:
  (a) emergency valve means operative in response to an emergency rate of reduction of said brake pipe fluid under pressure for connecting said release chamber fluid under pressure to said exhaust passage in a parallel flow path with said service valve means upon operation of said transfer valve means, whereby said pressure differential across said power piston is such as to provide a higher braking force during an emergency brake application than during a service brake application; and
  (b) inshot valve means for controlling said exhaust of said release chamber fluid under pressure during operation of said emergency valve means thereby causing said higher brake force to follow a predetermined braking force profile, said inshot valve means including piston means, subject to the fluid pressure retained in said exhaust passage by said check valve means, for reducing the amount of fluid and pressure exhausted from said release chamber, in proportion to the pressure retained in said exhaust passage.

27. Fluid pressure brake apparatus as recited in claim 25, wherein:
  (a) said railway vehicle includes a sprung and an unsprung member movable relative to each other; and
  (b) said changeover valve means is mounted on said vehicle to detect relative movement between said sprung and unsprung members and comprises:
    (i) an actuator engageable with the other of said sprung and unsprung members to effect shifting of said changeover valve between first and second positions thereof with relative movement of said sprung and unsprung members as the vehicle load condition changes between an empty and a load condition;
    (ii) an inlet to which said exhaust passage of said release chamber fluid under pressure is connected;
    (iii) a first outlet with which said inlet is communicated in said first position of said changeover valve, said first outlet being vented directly to atmosphere; and
    (iv) a second outlet with which said inlet is communicated in said second position of said changeover valve, said second outlet being connected to said check valve means.

28. Fluid pressure brake apparatus as recited in claim 25, wherein:
  (a) said railway vehicle includes a sprung and an unsprung member movable relative to each other; and
  (b) said changeover valve means is mounted on one of said sprung and unsprung members and comprises:
    (i) an actuator engageable with the other of said sprung and unsprung members to effect shifting of said changeover valve between first and second positions thereof with relative movement of said sprung and unsprung members as the vehicle load condition changes between an empty and a load condition;
    (ii) an inlet to which said exhaust passage of said release chamber fluid under pressure is connected;
    (iii) a first outlet with which said inlet is communicated in said first position of said changeover valve, said first outlet being vented directly to atmosphere; and
    (iv) a second outlet with which said inlet is communicated in said second position of said changeover valve, said second outlet being closed; and
  (c) said check valve means is arranged in a parallel flow path with said changeover valve means so as to vent said exhaust of said release chamber fluid under pressure in excess of said predetermined amount in either said first or said second position of said changeover valve means.

29. Fluid pressure brake apparatus, as recited in claim 26, further comprising:
  (a) an emergency reservoir; and
  (b) said emergency valve means being further operative in response to said emergency rate of reduction of said brake pipe fluid pressure for connecting fluid pressure from said emergency reservoir to said positioning chamber.

30. Fluid pressure brake apparatus as recited in claim 1, further comprising means for selectively retaining a predetermined amount of fluid under pressure in said positioning chamber during said venting thereof in said charging position of said charging valve means.

31. Fluid pressure brake apparatus as recited in claim 30, wherein said retaining means comprises:
  (a) a manually operated valve having an open position in which fluid pressure communication is established between said control valve device and said positioning chamber and a closed position in which said fluid pressure communication is interrupted; and
  (b) a first one-way check valve in parallel with said manually operated valve via which fluid pressure is directed from said positioning chamber to provide said venting of said positioning chamber fluid pressure until said fluid pressure thereof is reduced to said predetermined amount when said manually operated valve is in said closed position; and
  (c) a second one-way check valve in parallel with said manually operated valve via which fluid pressure is directed to accommodate said supply of said release chamber fluid pressure to said positioning chamber when said manually operated valve is in said closed position.

32. Fluid pressure brake apparatus as recited in claim 1, further comprising manual release valve means for venting said application chamber fluid under pressure.

33. Fluid pressure brake apparatus as recited in claim 32, wherein said service valve means further comprises piston means subject opposingly to said brake pipe and application chamber fluid under pressure for operating said service valve means to a release position in which said charging valve means is operated to said charging position in response to said release of fluid under pressure from said application chamber.

34. Fluid pressure brake apparatus as recited in claim 1, wherein said charging valve means includes quick service valve means for connecting said brake pipe fluid under pressure to said positioning chamber in said cut-off position of said charging valve means.

35. Fluid pressure brake apparatus as recited in claim 34, wherein said charging valve means further comprises limiting valve means for interrupting said connection of said brake pipe fluid under pressure to said positioning chamber when said positioning chamber fluid under pressure exceeds a predetermined amount.

36. Fluid pressure brake apparatus as recited in claim 1, further comprising continuous quick service valve means for effecting a periodic exhaust of said brake pipe fluid under pressure in response to a continuing reduction of said brake pipe fluid pressure.

37. Fluid pressure brake apparatus for a railway vehicle operative in response to variation of fluid under pressure in a brake pipe of said vehicle comprising:
  (a) a brake cylinder device having:
    (i) a power cylinder portion;
    (ii) a power piston operatively disposed in said power cylinder portion and cooperating therewith to form an application chamber on one side of said power piston and a release chamber on the opposite side thereof;
    (iii) a positioning cylinder portion;
    (iv) a positioning piston operatively disposed in said positioning cylinder portion for engagement with said power piston, said positioning piston cooperating with said positioning cylinder portion to form on one side thereof a positioning chamber;
    (v) biasing means for urging said power piston toward a brake release position; and
  (b) a control valve device including:
    (i) an exhaust passage;
    (ii) charging valve means having a charging position in which said positioning chamber is vented and said application and release chambers are in fluid pressure communication with said brake pipe, whereby said bias means is effective to move said power piston to said brake release position and having a cut-off position in which said venting of said positioning chamber and said charging of said application and release chambers is interrupted;
    (iii) service valve means operable to an application position in response to a reduction of said brake pipe fluid under pressure for operating said charging valve means to said cut-off position and for conducting flow of fluid under pressure from said release chamber to said position chamber, said positioning piston and accordingly said power piston being movable from said brake release position to a brake application position when the fluid pressure in said positioning chamber reaches a predetermined value; and
    (iv) transfer valve means operatively responsive to said positioning chamber fluid under pressure relative to said release chamber fluid pressure for establishing fluid pressure communication between said release chamber and said exhaust passage to thereby establish a pressure differential between said application and release chambers to cause said power piston to provide a braking force.

38. Fluid pressure brake apparatus as recited in claim 37, wherein said transfer valve means is responsive upon a predetermined ratio of said release chamber fluid pressure to said positioning chamber fluid pressure.

39. Fluid pressure brake apparatus as recited in claim 38, wherein said transfer valve means is further responsive to said linear relationship and to a predetermined biasing force.

40. Fluid pressure brake apparatus as recited in claim 37, wherein said transfer valve means comprises:
  (a) piston means having differential pressure areas subject on opposite sides of said piston to said fluid under pressure in said positioning chamber and said release chamber; and
  (b) valve means for providing said fluid pressure communication between said release chamber and said exhaust passage when said piston means is actuated in response to a predetermined linear relationship between said positioning chamber fluid pressure and said release chamber fluid pressure.

41. Fluid pressure brake apparatus as recited in claim 40, wherein said piston means comprises:
  (a) a first piston subject to said positioning chamber fluid pressure on one side and atmospheric pressure on the other side; and
  (b) a second piston cooperative with said first piston subject to said release chamber fluid pressure opposing said positioning chamber fluid pressure and to atmospheric pressure on the opposite side, whereby said differential pressure areas establish said linear relationship.

42. Fluid pressure brake apparatus as recited in claim 40, wherein said transfer valve means is further responsive to said linear relationship and to a predetermined biasing force.

43. Fluid pressure brake apparatus as recited in claim 42, wherein said predetermined biasing force is provided by a spring means.

44. Fluid pressure brake apparatus as recited in claim 37, wherein said operation of said transfer valve means occurs when said positioning chamber fluid under pressure exceeds said predetermined value by an amount that varies with the fluid pressure in said release chamber.

45. Fluid pressure brake apparatus as recited in claim 44, wherein said transfer valve means comprising:
  (a) valve means having an open position in which said flow of said release chamber fluid under pressure conducted to said positioning chamber is connected to said exhaust passage, and a closed position for cutting off said connection of said release chamber fluid pressure to said exhaust passage; and
  (b) piston means subject opposingly to said fluid under pressure in said positioning chamber and in said release chamber for operating said valve means to said open position when said positioning chamber fluid pressure exceeds said predetermined value by said amount that varies with the pressure of said release chamber.

46. Fluid pressure brake apparatus as recited in claim 37, further comprising biasing means for providing a force on said service valve means in a direction opposite to movement thereof to said application position, such biasing being variable prior to said actuation of said transfer valve means and constant thereafter.

47. Fluid pressure brake apparatus as recited in claim 46, wherein said biasing means is opposed from acting on said service valve means by spring means during movement of said service valve means in a direction opposite the direction of movement toward said application position, when said movement is in response to an increase of said brake pipe fluid pressure.

48. Fluid pressure brake apparatus as recited in claim 46, wherein such force provided by said biasing means is proportional to said fluid pressure in said positioning chamber.

49. Fluid pressure brake apparatus as recited in claim 46, further comprising means for selectively retaining a predetermined amount of fluid under pressure in said positioning chamber during said venting thereof in said charging position of said charging valve means.

50. Fluid pressure brake apparatus as recited in claim 48, wherein said biasing means comprising:
   (a) a compensating piston subject to said positioning chamber fluid pressure; and
   (b) a stem projecting from said piston into engagement with said service valve means whereby such force provided by said biasing means is transmitted to said service valve means.

51. Fluid pressure brake apparatus as recited in claim 49, wherein said retaining means comprises:
   (a) a manually operated valve having an open position in which fluid pressure communication is established between said control valve device and said positioning chamber and a closed position in which said fluid pressure communication is interrupted; and
   (b) a first one-way check valve in parallel with said manually operated valve via which fluid pressure is directed from said positioning chamber to provide said venting of said positioning chamber fluid pressure until said fluid pressure thereof is reduced to said predetermined amount when said manually operated valve is in said closed position; and
   (c) a second one-way check valve in parallel with said manually operated valve via which fluid pressure is directed to accommodate said supply of said release chamber fluid pressure to said positioning chamber when said manually operated valve is in said closed position.

52. Fluid pressure brake apparatus as recited in claim 50, further comprising spring means including:
   (a) a spring acting on said compensating piston in said application direction; and
   (b) means for caging said spring such that said spring is prevented from acting on said compensating piston during movement of said service valve means in a direction opposite the direction of movement toward said application position when said movement is in response to an increased pressure of said brake pipe fluid pressure.

53. Fluid pressure brake apparatus as recited in claim 37, further comprising means for modulating said braking force provided by said power piston according to the condition of loading of said railway vehicle.

54. Fluid pressure brake apparatus as recited in claim 53, wherein said modulating means comprises:
   (a) check valve means for venting said exhaust passage of said release chamber fluid pressure in excess of a predetermined amount; and
   (b) changeover valve means having first and second positions for connecting said exhaust passage to atmosphere directly when said vehicle is in a load condition and connecting said exhaust passage to atmosphere via said check valve means when said vehicle is in an empty condition.

55. Fluid pressure brake apparatus as recited in claim 54, further comprising:
   (a) emergency valve means operative in response to an emergency rate of reduction of said brake pipe fluid under pressure for connecting said release chamber fluid under pressure to said exhaust passage in a parallel flow path with said service valve means upon operation of said transfer valve means, whereby said pressure differential across said power piston is such as to provide a higher braking force during an emergency brake application than during a service brake application; and
   (b) inshot valve means for controlling said exhaust of said release chamber fluid under pressure during operation of said emergency valve means thereby causing said higher brake force to follow a predetermined braking force profile, said inshot valve means including piston means, subject to the fluid pressure retained in said exhaust passage by said check valve means, for reducing the amount of fluid and pressure exhausted from said release chamber, in proportion to the pressure retained in said exhaust passage.

56. Fluid pressure brake apparatus, as recited in claim 55, further comprising:
   (a) an emergency reservoir; and
   (b) said emergency valve means being further operative in response to said emergency rate of reduction of said brake pipe fluid pressure for connecting fluid pressure from said emergency reservoir to said positioning chamber.

57. Fluid pressure brake apparatus as recited in claim 37, further comprising means for selectively retaining a predetermined amount of fluid under pressure in said positioning chamber during said venting thereof in said charging position of said charging valve means.

58. Fluid pressure brake apparatus as recited in claim 57, wherein said retaining means comprises:
   (a) a manually operated valve having an open position in which fluid pressure communication is established between said control valve device and said positioning chamber and a closed position in which said fluid pressure communication is interrupted; and
   (b) a first one-way check valve in parallel with said manually operated valve via which fluid pressure is directed from said positioning chamber to provide said venting of said positioning chamber fluid pressure until said fluid pressure thereof is reduced to said predetermined amount when said manually operated valve is in said closed position; and
   (c) a second one-way check valve in parallel with said manually operated valve via which fluid pressure is directed to accommodate said supply of said release chamber fluid pressure to said positioning chamber when said manually operated valve is in said closed position.

59. Fluid pressure brake apparatus as recited in claim 37, further comprising manual release valve means for venting said application chamber fluid under pressure.

60. Fluid pressure brake apparatus as recited in claim 59, wherein said service valve means further comprises piston means subject opposingly to said brake pipe and application chamber fluid under pressure for operating said service valve means to a release position in which said charging valve means is operated to said charging position in response to said release of fluid under pressure from said application chamber.

61. Fluid pressure brake apparatus as recited in claim 37, wherein said charging valve means includes quick service valve means for connecting said brake pipe fluid under pressure to said positioning chamber in said cut-off position of said charging valve means.

62. Fluid pressure brake apparatus as recited in claim 31, wherein said charging valve means further comprises limiting valve means for interrupting said connection of said brake pipe fluid under pressure to said positioning chamber when said positioning chamber fluid under pressure exceeds a predetermined amount.

63. Fluid pressure brake apparatus as recited in claim 37, further comprising continuous quick service valve means for effecting a periodic exhaust of said brake pipe fluid under pressure in response to a continuing reduction of said brake pipe fluid pressure.

64. Fluid pressure brake apparatus for a railway vehicle operative in response to variation of fluid pressure in a brake pipe of said vehicle comprising:
   (a) a brake cylinder device including at least one piston forming an application chamber and a release chamber on opposite sides thereof in which fluid under pressure is normally stored and a return spring urging said piston toward a brake release position, said piston being operative in response to the exhaust of fluid under pressure from said release chamber to provide a braking force in accordance with the pressure differential between said application and release chambers;
   (b) control valve means operative in response to a reduction of said brake pipe fluid pressure for connecting said fluid under pressure from said release chamber to an exhaust passage;
   (c) check valve means for venting said exhaust passage of said fluid under pressure from said release chamber when the pressure therein exceeds a predetermined amount; and
   (d) changeover valve means having first and second positions for connecting said exhaust passage to atmosphere directly when said vehicle is in a load condition and connecting said exhaust passage to atmosphere via said check valve means when said vehicle is in an empty condition.

65. Fluid pressure brake apparatus as recited in claim 64, wherein:
   (a) said railway vehicle includes a sprung and an unsprung member movable relative to each other; and
   (b) said changeover valve means is mounted on said vehicle to detect relative movement between said sprung and unsprung members and comprises:
      (i) an actuator engageable with the other of said sprung and unsprung members to effect shifting of said changeover valve between first and second positions thereof with relative movement of said sprung and unsprung members as the vehicle load condition changes between an empty and a load condition;
      (ii) an inlet to which said exhaust passage of said release chamber fluid under pressure is connected;
      (iii) a first outlet with which said inlet is communicated in said first position of said changeover valve, said first outlet being vented directly to atmosphere; and
      (iv) a second outlet with which said inlet is communicated in said second position of said changeover valve, said second outlet being connected to said check valve means.

66. Fluid pressure brake apparatus as recited in claim 64, wherein:
   (a) said railway vehicle includes a sprung and an unsprung member movable relative to each other; and
   (b) said changeover valve means is mounted on one of said sprung and unsprung members and comprises:
      (i) an actuator engageable with the other of said sprung and unsprung members to effect shifting of said changeover valve between first and second positions thereof with relative movement of said sprung and unsprung members as the vehicle load condition changes between an empty and a load condition;
      (ii) an inlet to which said exhaust passage of said release chamber fluid under pressure is connected;
      (iii) a first outlet with which said inlet is communicated in said first position of said changeover valve, said first outlet being vented directly to atmosphere; and
      (iv) a second outlet with which said inlet is communicated in said second position of said changeover valve, said second outlet being closed; and
   (c) said check valve means is arranged in a parallel flow path with said changeover valve means so as to vent said exhaust of said release chamber fluid under pressure in excess of said predetermined amount in either said first or said second position of said changeover valve means.

67. Fluid pressure brake apparatus for a railway vehicle operative in response to variation of fluid under pressure in a brake pipe of said vehicle comprising:
   (a) a brake cylinder device having:
      (i) a power cylinder portion;
      (ii) a power piston operatively disposed in said power cylinder portion and cooperating therewith to form an application chamber on one side of said power piston and a release chamber on the opposite side thereof;
      (iii) a positioning cylinder portion;
      (iv) a positioning piston operatively disposed in said positioning cylinder portion for engagement with said power piston, said positioning piston cooperating with said positioning cylinder portion to form on one side thereof a positioning chamber;
      (v) biasing means for urging said power piston toward a brake release position; and
   (b) a control valve device including:
      (i) charging valve means having a charging position in which said positioning chamber is vented and said application and release chambers are in fluid pressure communication with said brake pipe, and said bias means being effective to move said power piston to said brake release position and having a cut-off position in which said venting of said positioning chamber and said charging of said application and release chambers is interrupted;
      (ii) service valve means operable to an application position in response to a reduction of said brake pipe fluid pressure for operating said charging valve means to said cut-off position and for conducting flow of fluid under pressure from said release chamber to said positioning chamber, said positioning piston and accordingly said power piston being movable from said brake release position to a brake application position when the fluid pressure in said positioning chamber reaches a predetermined value; and (c) biasing means for providing a force on said service valve means in a direction opposite to movement thereof to said application position, such biasing being variable prior to said actuation of said transfer valve means and constant thereafter.

68. Fluid pressure brake apparatus as recited in claim 67, wherein said biasing means is opposed from acting on said service valve means by spring means during movement of said service valve means in a direction opposite the direction of movement toward said application position, when said movement is in response to an increase of said brake pipe fluid pressure.

69. Fluid pressure brake apparatus as recited in claim 67, wherein such force provided by said biasing means is proportional to said fluid pressure in said positioning chamber.

70. Fluid pressure brake apparatus as recited in claim 67, wherein said biasing means comprising:
 (a) a compensating piston subject to said positioning chamber fluid pressure; and
 (b) a stem projecting from said piston into engagement with said service valve means whereby such force provided by said biasing means is transmitted to said service valve means.

71. Fluid pressure brake apparatus as recited in claim 68, wherein such force provided by said biasing means is proportional to said fluid pressure in said positioning chamber.

72. Fluid pressure brake apparatus as recited in claim 70, further comprising spring means including:
 (a) a spring acting on said compensating piston in said application direction; and
 (b) means for caging said spring such that said spring is prevented from acting on said compensating piston during movement of said service valve means in a direction opposite the direction of movement toward said application position when said movement is in response to an increased pressure of said brake pipe fluid pressure.

73. In a railway vehicle brake cylinder device controlled in accordance with variation of fluid under pressure carried in a brake pipe of the vehicle and having a brake piston, said brake piston including a positioning area, an application area and a release area, said positioning and application areas opposing said release area, wherein braking force is produced in accordance with a reduction of the fluid pressure acting on said release area relative to the fluid pressure acting on said application area, the method of applying said vehicle brake comprising the steps of:
 (a) imposing a fluid pressure generally equal to the pressure of said brake pipe upon said application and release areas;
 (b) upon a reduction of said brake pipe fluid pressure, connecting the fluid under pressure imposed upon said release area to the fluid pressure imposed upon said positioning area to effect movement of said piston from a release position to an application position;
 (c) sensing the pressure imposed upon said positioning area relative to the pressure imposed upon said release area to indicate said movement of said piston to said application position, and
 (d) transferring said connection of said fluid pressure imposed upon said release area from said positioning area to atmosphere when said pressure acting imposed upon said positioning area reaches a predetermined relationship to the pressure imposed upon said release area.

74. The method as recited in claim 73, wherein said predetermined relationship of the respective pressure is linear.

75. The method as recited in claim 73, wherein said predetermined relationship is such that the pressure imposed upon said positioning area is generally equal to a constant plus a linear function of the pressure imposed upon said release area.

76. In a railway vehicle brake cylinder device controlled in accordance with variation of fluid under pressure carried in a brake pipe of the vehicle and having a brake piston, said brake piston including a positioning area, an application area and a release area, said positioning and application areas opposing said release area, wherein braking force is produced in accordance with a reduction of the fluid pressure acting on said release area relative to the fluid pressure acting on said application area, the method of applying said vehicle brake comprising the steps of:
 (a) imposing a fluid pressure generally equal to the pressure of said brake pipe upon said application and release areas;
 (b) upon a reduction of said brake pipe fluid pressure, connecting the fluid under pressure imposed upon said release area to the fluid pressure imposed upon said positioning area to effect movement of said piston from a release position to an application position;
 (c) sensing the pressure imposed upon said positioning area relative to the pressure imposed upon said release area to indicate said movement of said piston to said application position, and
 (d) transferring said connection of said fluid pressure imposed upon said release area from said positioning area to atmosphere when said pressure acting imposed upon said positioning area reaches a predetermined relationship to the pressure imposed upon said release area.

77. The method as recited in claim 76, wherein said predetermined relationship of the respective pressure is linear.

78. The method as recited in claim 76, wherein said predetermined relationship is such that the pressure imposed upon said application area is generally equal to a constant plus a linear function of the pressure imposed upon said release area.

* * * * *